(12) United States Patent
Kim

(10) Patent No.: US 9,210,367 B2
(45) Date of Patent: Dec. 8, 2015

(54) METHOD AND TERMINAL FOR REPRODUCING CONTENT

(71) Applicant: Samsung Electronics Co. Ltd., Suwon-si, Gyeonggi-do (KR)

(72) Inventor: Jong-hyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 14/132,907

(22) Filed: Dec. 18, 2013

(65) Prior Publication Data

US 2014/0178034 A1 Jun. 26, 2014

(30) Foreign Application Priority Data

Dec. 21, 2012 (KR) .................. 10-2012-0150931
Mar. 8, 2013 (KR) .................. 10-2013-0025255

(51) Int. Cl.
*H04N 9/80* (2006.01)
*H04N 5/765* (2006.01)
*H04N 9/82* (2006.01)

(52) U.S. Cl.
CPC ............ *H04N 5/765* (2013.01); *H04N 9/8205* (2013.01)

(58) Field of Classification Search
CPC ............................. H04N 9/8205; H04N 9/765
USPC .................. 386/239, 241, 248, 262, 323, 353
See application file for complete search history.

(56) References Cited

U.S. PATENT DOCUMENTS

| | | |
|---|---|---|
| 2007/0089143 A1 | 4/2007 | LeFevre et al. |
| 2011/0119347 A1* | 5/2011 | Lee et al. ............... 709/217 |
| 2011/0123168 A1 | 5/2011 | Cho et al. |
| 2012/0210352 A1 | 8/2012 | Wong et al. |

FOREIGN PATENT DOCUMENTS

| | | |
|---|---|---|
| JP | 2011-155532 A | 1/2011 |
| JP | 2011-155532 | 8/2011 |
| KR | 2006-0117939 A | 11/2006 |
| KR | 2009-0116232 A | 11/2009 |
| KR | 2010-0012013 A | 2/2010 |
| KR | 2012-0009536 A | 2/2012 |
| KR | 2012-0110594 A | 10/2012 |

* cited by examiner

*Primary Examiner* — Robert Chevalier
(74) *Attorney, Agent, or Firm* — Jefferson IP Law, LLP

(57) ABSTRACT

A method of reproducing content is provided. The method performed by a terminal includes operations of obtaining metadata corresponding to a predetermined portion of the content, selecting, based on the metadata, at least one external device to reproduce the predetermined portion of the content, transmitting a control command to the at least one external device, and reproducing the predetermined portion of the content by interoperation of the terminal with the at least one external device to which the control command is transmitted.

20 Claims, 21 Drawing Sheets

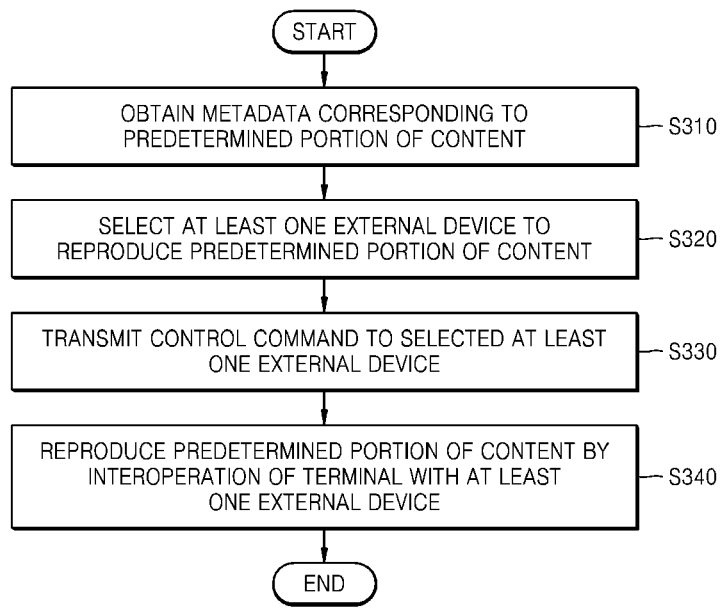

FIG. 4A

Time Stamp (410) | Device Command (420)
— Device Category (421) | Control Command (422) | Optional Data (423) | <Repeat>
<Repeat>

FIG. 4B

Time Stamp (410): 930000 | Device Command 1 (420-1) [Device Category: Speaker, Control Command: Play Sound, Optional Data: Sound Data] | Device Command 2 (420-2) [Device Category: Robot Cleaner, Control Command: Start Cleaning, Optional Data: Auto Mode] | Time Stamp: 1020000 | ...

METHOD AND TERMINAL FOR REPRODUCING CONTENT

CROSS-REFERENCE TO RELATED APPLICATION(S)

This application claims the benefit under 35 U.S.C. §119(a) of a Korean patent application filed on Dec. 21, 2012 in the Korean Intellectual Property Office and assigned Ser. No. 10-2012-0150931, and of a Korean patent application filed on Mar. 8, 2013 in the Korean Intellectual Property Office and assigned Ser. No. 10-2013-0025255, the entire disclosures of which are hereby incorporated by reference.

TECHNICAL FIELD

The present disclosure relates to a method and terminal for reproducing content along with an external device connected to the terminal.

BACKGROUND

As a result of on-going developments in communication technology, an application may be simultaneously executed on a device as well as various peripheral devices connected to the device. In addition, the device may control the various peripheral devices via other application.

In addition, as various peripheral devices that can be connected to other device via an application are nowadays widely manufactured, there is a demand for a content reproduction system that allows a user to reproduce content in various ways by using various peripheral devices when the user watches the content via another device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of reproducing, by a terminal, a predetermined portion of content by interoperation of the terminal and an external device connected thereto.

Additional aspects will be set forth in part in the description which follows and, in part, will be apparent from the description, or may be learned by practice of the presented embodiments.

In accordance with an aspect of the present disclosure, a method of reproducing content is provided. The method includes operations of obtaining metadata corresponding to a predetermined portion of the content, selecting, based on the metadata, at least one external device to reproduce the predetermined portion of the content, transmitting a control command to the at least one external device, and reproducing the predetermined portion of the content by interoperation of the terminal with the at least one external device to which the control command is transmitted.

In accordance with another aspect of the present disclosure, the method may further include operations of executing a first application for reproducing the content and executing a second application for controlling the at least one external device.

In accordance with another aspect of the present disclosure, the first application may transmit control information included in the metadata to the second application, and the second application may convert the control information into the control command according to a control protocol of the at least one external device.

In accordance with another aspect of the present disclosure, the content may include at least one of education content, movie content, broadcasting content, and game content.

In accordance with another aspect of the present disclosure, the metadata may include at least one of information about the predetermined portion, IDentification (ID) information of the at least one external device, and capability information about a capability to be performed by the at least one external device.

In accordance with another aspect of the present disclosure, the operation of obtaining the metadata may include an operation of extracting the metadata inserted into the content.

In accordance with another aspect of the present disclosure, the operation of obtaining the metadata may include an operation of receiving from an external source and separately from the content the metadata corresponding to the predetermined portion of the content.

In accordance with another aspect of the present disclosure, the operation of obtaining the metadata may include an operation of generating the metadata corresponding to the predetermined portion of the content by performing image processing on the content.

In accordance with another aspect of the present disclosure, the operation of generating of the metadata may include an operation of generating the metadata corresponding to the predetermined portion of the content by considering a type of the at least one external device connected to the terminal.

In accordance with another aspect of the present disclosure, the operation of generating of the metadata may include operations of detecting connection of another external device while the content is reproduced and generating the metadata corresponding to the predetermined portion by further considering the connection of the other external device.

In accordance with another aspect of the present disclosure, when reproduction of the content is completed, the method may further include an operation of deleting the metadata.

In accordance with another aspect of the present disclosure, when the content is deleted, the method may further include an operation of deleting the metadata.

In accordance with another aspect of the present disclosure, the operation of obtaining the metadata may include operations of transmitting the content to a gateway that connects the terminal and the at least one external device, and contemporaneously requesting the metadata corresponding to the predetermined portion of the content, and receiving the metadata corresponding to the predetermined portion of the content from the gateway that has generated the metadata by performing image processing on the content.

In accordance with another aspect of the present disclosure, the method may further include an operation of establishing connection with the at least one external device before the predetermined portion of the content is reproduced.

In accordance with another aspect of the present disclosure, the operation of establishing the connection with the at least one external device may include an operation of performing short-distance communication with the at least one external device, and the short-distance communication may be performed based on at least one of a Wireless Local Area Network (wireless LAN), Bluetooth, Wi-Fi Direct (WFD), Ultra WideBand (UWB), and ZigBee.

In accordance with another aspect of the present disclosure, the operation of selecting may include an operation of selecting of the at least one external device the at least one external device that is to reproduce the predetermined portion of the content and that is from among a plurality of external devices connected to the terminal.

In accordance with another aspect of the present disclosure, the method may further include an operation of displaying a list of the plurality of external devices connected to the terminal.

In accordance with another aspect of the present disclosure, the operation of transmitting the control command may include an operation of transmitting the control command to the at least one external device via a gateway that connects the terminal and the at least one external device.

In accordance with another aspect of the present disclosure, the gateway may convert the control information into the control command according to a control protocol of the at least one external device.

In accordance with another aspect of the present disclosure, when the control command is transmitted to the at least one external device, the operation of reproducing of the predetermined portion of the content includes an operation of discontinuing reproduction of the content, and when a message corresponding to the control command is received from the at least one external device, the operation of reproducing includes an operation of resuming reproduction of the discontinued content.

In accordance with another aspect of the present disclosure, the control command may include a command for controlling the at least one external device to display a question included in the content, and the message corresponding to the control command may include a response message with respect to the question included in the content.

In accordance with another aspect of the present disclosure, the control command may include a command for controlling the at least one external device to perform setting according to a setting value included in the content, and the message corresponding to the control command may include a completion message with respect to the setting.

In accordance with an aspect of the present disclosure, a terminal is provided. The terminal includes a memory configured to store at least one program and a control unit configured to reproduce content by executing the at least one program, wherein the at least one program includes commands for obtaining, by the terminal, metadata corresponding to a predetermined portion of the content, selecting, by the terminal, at least one external device to reproduce the predetermined portion of the content, based on the metadata, transmitting, by the terminal, a control command to the at least one external device, and reproducing, by the terminal, the predetermined portion of the content by interoperation of the terminal with the at least one external device to which the control command is transmitted.

In accordance with another aspect of the present disclosure, the control unit may execute a first application for reproducing the content, and a second application for controlling the at least one external device.

In accordance with another aspect of the present disclosure, the control unit may extract the metadata inserted into the content.

In accordance with another aspect of the present disclosure, the terminal may further include a communication unit configured to receive the metadata corresponding to the predetermined portion of the content from an external source, separately from the content.

In accordance with another aspect of the present disclosure, the control unit may generate the metadata corresponding to the predetermined portion of the content by performing image processing on the content.

In accordance with another aspect of the present disclosure, the control unit may generate the metadata corresponding to the predetermined portion of the content by considering a type of the at least one external device connected to the terminal.

In accordance with another aspect of the present disclosure, the control unit may detect connection of another external device while the content is reproduced, and may generate the metadata corresponding to the predetermined portion by further considering the connection of the other external device.

In accordance with another aspect of the present disclosure, when reproduction of the content is completed, the control unit may delete the metadata.

In accordance with another aspect of the present disclosure, when the content is deleted, the control unit may delete the metadata.

In accordance with another aspect of the present disclosure, the terminal may further include a communication unit configured to transmit the content to a gateway that connects the terminal and the at least one external device and to contemporaneously request the metadata corresponding to the predetermined portion of the content, and then to receive the metadata corresponding to the predetermined portion of the content from the gateway that has generated the metadata by performing image processing on the content.

In accordance with another aspect of the present disclosure, the control unit may establish connection with the at least one external device before the predetermined portion of the content is reproduced.

In accordance with another aspect of the present disclosure, the control unit may select the at least one external device that is to reproduce the predetermined portion of the content and that is from among a plurality of external devices connected to the terminal.

In accordance with another aspect of the present disclosure, the terminal may further include a display unit configured to display a list of the plurality of external devices connected to the terminal.

In accordance with another aspect of the present disclosure, the terminal may further include a communication unit configured to transmit the control command to the at least one external device via a gateway that connects the terminal and the at least one external device.

In accordance with another aspect of the present disclosure, when the control command is transmitted to the at least one external device, the control unit may discontinue reproduction of the content, and when a message corresponding to the control command is received from the at least one external device, the control unit may resume reproduction of the discontinued content.

In accordance with another aspect of the present disclosure, a system for reproducing content is provided. The system includes at least one external device, and a terminal that is operatively connected to the at least one external device. The terminal may be configured to reproduce content, to obtain metadata corresponding to a predetermined portion of the content, to select, based on the metadata, at least one of the at least one external device to perform a function associated with the predetermined portion of the content, and to transmit a control command to the at least one external device. The at least one external device is configured to receive the control command, and to perform the function associated with the predetermined portion of the content.

In accordance with another aspect of the present disclosure, the system may include a gateway configured to connect the terminal and the at least one external device.

In accordance with another aspect of the present disclosure, the gateway may be configured to mediate communication between the terminal and the at least one external device so as to convert the control command transmitted by the terminal to a protocol of the at least one external device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a flowchart of a method of reproducing content, according to an embodiment of the present disclosure;

FIGS. 4A and 4B illustrate a configuration of metadata, according to an embodiment of the present disclosure;

Throughout the drawings, it should be noted that like reference numbers are used to depict the same or similar elements, features, and structures.

DETAILED DESCRIPTION

Figure 1:
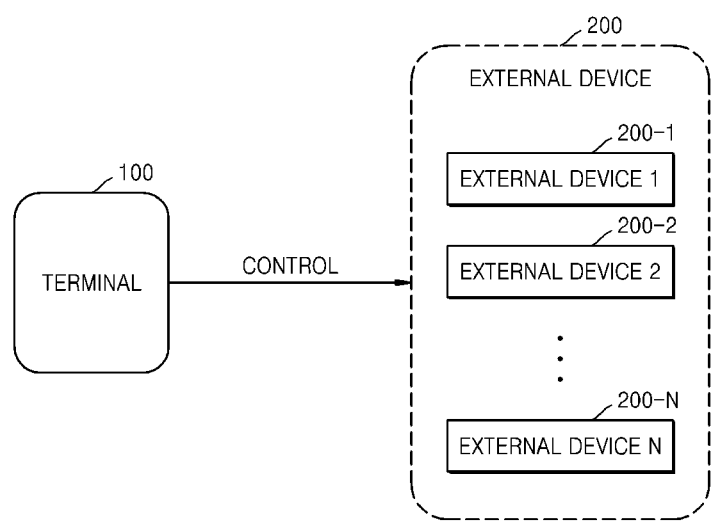
FIG. 1 is a diagram of a content reproduction system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, when a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or may be embodied by combining hardware and software.

Throughout the specification, the term "application" means a group of computer programs designed to perform particular tasks. In the specification, the application may be of different types. For example, the application may be, but is not limited to, a game application, a musical instrument play application, a moving picture reproduction application, a map application, a broadcasting application, an exercise support application, a payment application, and/or the like.

Throughout the specification, the term "topology" means the arrangement of devices (or nodes). The topology may include physical topology and logical topology. For example, the topology may be defined according to physical or logical connection between the devices that belong to a topology structure. For example, different topologies may be defined by at least one of a cooperative relationship between the devices, a method of connecting the devices, a data transmission speed between the devices, a flow of data exchanged between the devices, a type of a signal exchanged between the devices, and a type of an application installed in each of the devices.

In addition, throughout the specification, a host terminal, a main external device, and a sub external device may be determined according to a position of devices, and an absolute or relative role of the devices in the topology structure. Thus, a predetermined device may operate as at least one of the host terminal, the main external device, and the sub external device in the topology structure.

Various embodiments of the present disclosure will now be described more fully with reference to the accompanying drawings. However, various embodiments of the present disclosure may be embodied in many different forms, and should not be construed as being limited to the various embodiments set forth herein, Rather, the various embodiments described herein are provided so that the present disclosure is thorough and complete, and will fully convey the concept of the various embodiments of the present disclosure to those of ordinary skill in the art. In the following description, well-known functions or constructions are not described in detail because descriptions thereof may obscure various embodiments of the present disclosure with unnecessary detail. In the following description, reference numerals in the drawings denote like or similar elements throughout the specification.

As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram of a content reproduction system according to an embodiment of the present disclosure.

Figure 18:
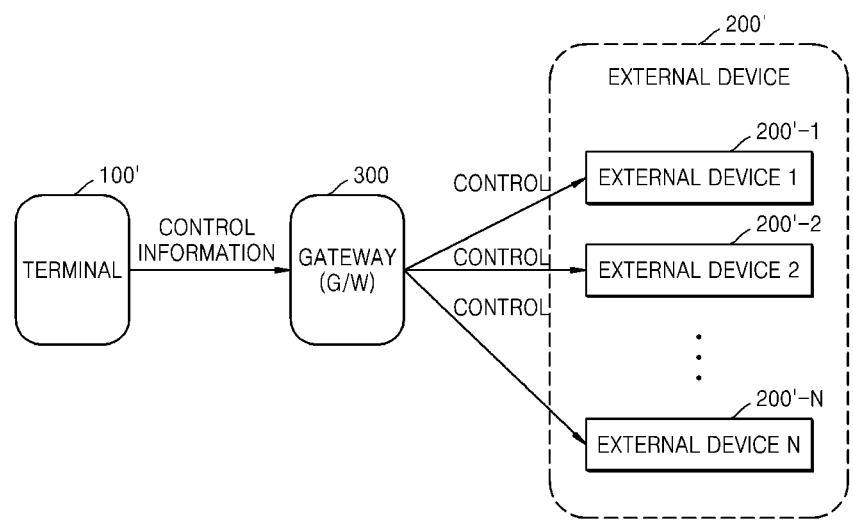
FIG. 18 is a diagram of a content reproduction system, according to an embodiment of the present disclosure.

Referring to FIG. 1, the content reproduction system may include a terminal 100 and an external device 200. However, not all shown elements are necessary elements. For example, the content reproduction system may be embodied with more or less elements than the shown elements. For example, as illustrated in FIG. 18 and as described in relation thereto, the content reproduction system may further include a gateway to connect the terminal 100 and the external device 200.

According to various embodiments of the present disclosure, the terminal may connect to a combination of external devices 200-1 to 200-N.

The terminal 100 may be connected to the external device 200 in a wired or wireless manner. In particular, according to various embodiments of the present embodiment, the terminal 100 may communicate with the external device 200 via short-distance communication. Examples of the short-distance communication may include, but are not limited to, a wireless Local Area Network (LAN) (e.g., Wi-Fi), Near Field Communication (NFC), Bluetooth, Bluetooth Low Energy (BLE), ZigBee, Wi-Fi Direct (WFD), Ultra WideBand (UWB), and/or the like.

The terminal 100 may control the external device 200 by executing an application related to the external device 200. In addition, when the application is executed, the terminal 100 may automatically scan the external device 200 and may connect the terminal 100 to the external device 200. For example, according to various embodiments of the present embodiment, the terminal 100 may be connected to the external device 200 by executing a content reproduction application or a control application for controlling the external device 200.

In addition, the terminal 100 may reproduce predetermined content along with the external device 200 by using the content reproduction application or the control application for controlling the external device 200.

The terminal 100 may be variously embodied. For example, according to various embodiments of the present embodiment, the terminal 100 may be, but is not limited to, a mobile phone, a smartphone, a laptop computer, a tablet Personal Computer (PC), an MP3 player, a digital camera, a portable game console, a Global Positioning System (GPS) navigation, an electronic book terminal, a terminal for digital broadcasting, a Personal Digital Assistant (PDA), a Portable Multimedia Player (PMP), a navigation device, a smart TV, Consumer Electronic (CE) devices (e.g., a refrigerator, an air conditioner, or the like that have a display panel), and the like.

As disclosed above, the application that is executed in the terminal 100 may be related to the external device 200. For example, the content reproduction application or the control application may be related to the external device 200. According to various embodiments of the present disclosure, the external device 200 may be a single device or may be multiple devices.

The external device 200 may communicate with the terminal 100 via short-distance communication. In this case, the external device 200 may receive a control command from the terminal 100 via the short-distance communication. In addition, the external device 200 may transmit Input and Output (I/O) data (e.g., a message) to the terminal 100 via the short-distance communication.

The external device 200 may include a short-distance communication module. For example, the external device 200 may include a BLE module, an NFC module, and/or the like. The external device 200 may receive a connection request from the terminal 100 via BLE and/or NFC and then may activate a Wi-Fi module or a Bluetooth module. In addition, the external device 200 may transmit authentication information, connection information, or the like to the terminal 100 via BLE and/or NFC. The external device 200 may receive a control command from the terminal 100 and may perform the control command.

The external device 200 may be variously embodied. The external device 200 may include an input device, an output device, a control device, or the like. For example, the external device 200 may include, but is not limited to, a microphone, a speaker, a pedal, a joy stick, a musical instrument (e.g., a piano, an organ, an electric keyboard, a guitar, a violin, a cello, or the like), a game control device, a doll, a medical equipment, a sporting equipment, CE devices (e.g., an air-conditioner, an oven, a refrigerator, an electric fan, or the like), and the like.

Hereinafter, a method of registering and connecting the external device 200, the method performed by the terminal 100, will now be described with reference to FIG. 2.

Figure 2:
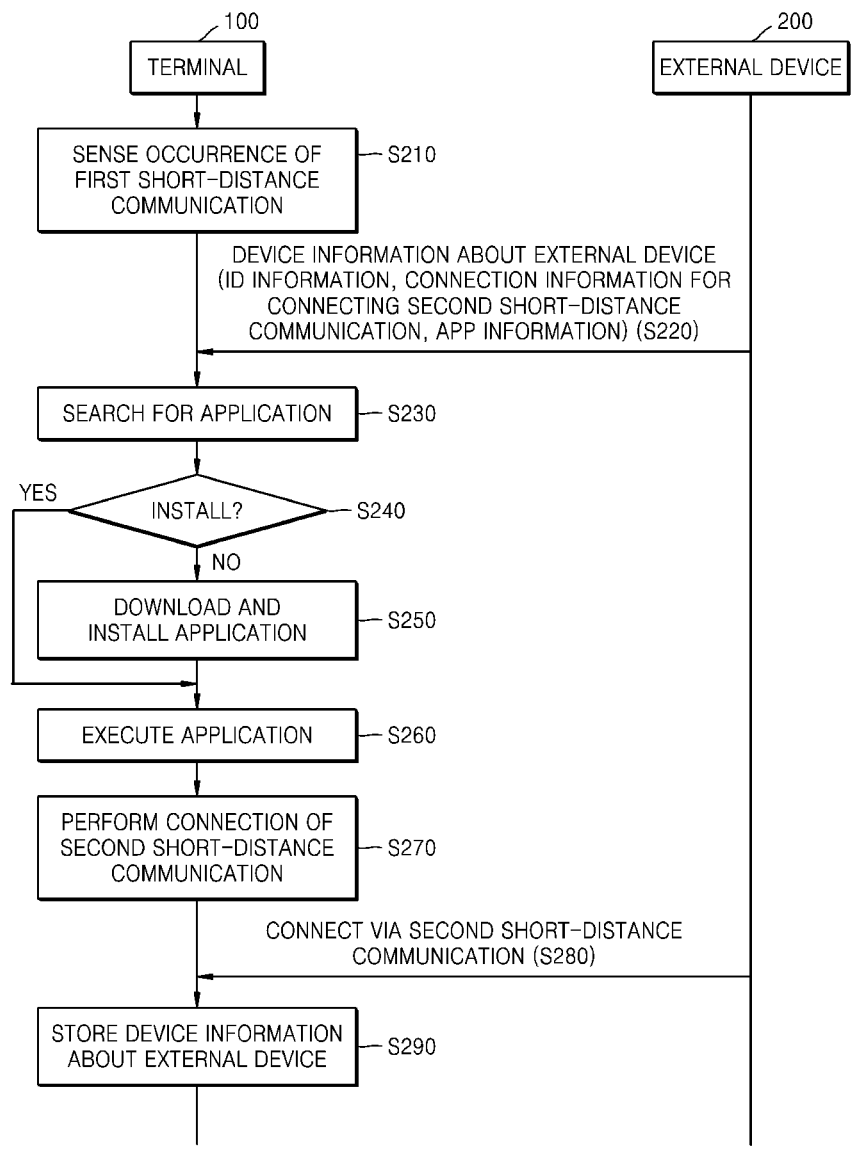
FIG. 2 is a flowchart of a method of connecting an external device, the method being performed by a terminal, according to an embodiment of the present disclosure.

FIG. 2 is a flowchart of a method of connecting the external device 200, the method performed by the terminal 100 according to an embodiment of the present disclosure.

Referring to FIG. 2, at operation S210, the terminal 100 may detect occurrence of first short-distance communication. According to various embodiments of the present disclosure, the first short-distance communication may be, but is not limited to, NFC and BLE communication.

According to various embodiments of the present disclosure, if the first short-distance communication is NFC-based communication, when the external device 200 is positioned within a range of the NFC-based communication, the terminal 100 may detect the occurrence of the first short-distance communication. According to various embodiments of the present disclosure, if the first short-distance communication is BLE-based communication, when the terminal 100 receives a signal broadcasted from the external device 200 via Bluetooth communication, the terminal 100 may detect the occurrence of the first short-distance communication.

At operation S220, the terminal 100 may receive device information about the external device 200 via the first short-distance communication. The device information about the external device 200 may include at least one of IDentification (ID) information of the external device 200, connection information for second short-distance communication, a type of the external device 200, information about a capability of the external device 200, information about a category and a protocol used to control the external device 200, and/or the like. According to various embodiments of the present disclosure, the capability of the external device 200 may be, but is not limited to, a supportable communication capability, an audio output capability, a video output capability, a voice recording capability, an image-capturing capability, a wind direction adjusting capability, a humidity detecting capability, and/or the like.

According to various embodiments of the present disclosure, the second short-distance communication may be, but is not limited to, wireless LAN communication and Bluetooth communication. The Wi-Fi may include an infrastructure mode using an Access Point (AP), a wireless router, or the like, and an ad hoc mode in which terminals exchange data by using a Peer-To-Peer (P2P) method without using an AP.

Thus, the connection information for the second short-distance communication may include a communication method performed by the external device 200, connection information (a Service Set IDentifier (SSID), an Internet Protocol (IP) address, a Media Access Control (MAC) address, a channel number, a security key, or the like) of the wireless LAN used by the external device 200, a MAC address of the external device 200, a Bluetooth address of the external device 200, a product name of the external device 200, profile information of the external device 200, or the like. The communication method may be the wireless LAN (the ad hoc mode or the infrastructure mode), Bluetooth, ZigBee, WFD, UWB, or the like.

According to various embodiments of the present disclosure, the device information about the external device 200 may further include information about an application related to the external device 200. The information about the application may include, but is not limited to, ID information of the application (e.g., an application ID, an application title, and an application classification code), version information of the application, and link information of the application (e.g., connection information of a web page for downloading the application).

At operation S230, the terminal 100 may search for an application. For example, the terminal 100 may search for the application related to the external device 200.

At operation S240, the terminal 100 may determine, based on the information about the application received from the external device 200, whether the application related to the external device 200 was previously installed in the terminal 100.

If the terminal 100 determines that the application related to the external device 200 was installed in terminal 100 at operation S240, then the terminal 100 may proceed to operation S260.

In contrast, when the terminal 100 determines that the application related to the external device 200 was not installed in the terminal 100 at operation S240, the terminal 100 may proceed to operation S250 at which the terminal 100 may download and install the application related to the external device 200.

At operation S260, the terminal 100 may execute the application.

At operation S270, the terminal 100 may perform the second short-distance communication. For example, when the second short-distance communication is Bluetooth communication, the terminal 100 may activate the Bluetooth communication module, and when the second short-distance communication is wireless LAN communication, the terminal 100 may activate the Wi-Fi module. Afterward, the terminal 100 may request the external device 200 for connection. For example, the terminal 100 may request that the external device 200 connect to the terminal 100 via the second short-distance communication.

At operation S280, when the external device 200 accepts the connection, the terminal 100 and the external device 200 may communicate with each other via the second short-distance communication.

At operation S290, the terminal 100 may store and manage the device information about the external device 200 in a memory. For example, when the device information about the external device 200 is changed, the terminal 100 may update the device information stored in the memory.

According to various embodiments of the present disclosure, the terminal 100 may scan the external device 200 in a Universal Plug and Play (UPnP) manner. For example, when a new external device is connected to a network, the terminal 100 may perform communication with the new external device and then may receive device information about the new external device (e.g., ID information, connection information for connecting second short-distance communication, information about an application related to the new external device, or the like) from the new external device. The terminal 100 may execute the application related to the new external device and may communicate with the new external device via the second short-distance communication.

According to various embodiments of the present disclosure, operations S210 through S290 may be performed before the terminal 100 reproduces content or may be performed in an early period during reproduction of the content. According to various embodiments of the present disclosure, operations S210 through S290 may be performed while the terminal 100 reproduces the content. For example, when the external device 200 joins a network while the terminal 100 reproduces the content, or when the terminal 100 detects occurrence of first short-distance communication performed by the external device 200, the terminal 100 may perform operations S220 through S290 during reproduction of the content.

According to various embodiments of the present disclosure, an order of operations S210 through S290 may be changed or some operations may be skipped.

In the embodiment illustrated in FIG. 2, the terminal 100 and the external device 200 communicate via the short-distance communication (e.g., Wi-Fi or Bluetooth). However, various embodiments of the present disclosure are not limited thereto. For example, according to various embodiments of the present disclosure, the terminal 100 and the external device 200 may communicate to each other in a wired manner via a mobile communication network or another short-distance communication (e.g., WFD, UWB, ZigBee, or the like).

Hereinafter, a method of reproducing a predetermined portion of content while the terminal 100 and the external device 200 are wiredly or wirelessly connected will now be described in detail with reference to FIG. 3.

FIG. 3 is a flowchart of a method of reproducing content according to an embodiment of the present disclosure.

At operation S310, the terminal 100 may obtain metadata corresponding to a predetermined portion of the content.

According to various embodiments of the present disclosure, the terminal 100 may extract the metadata corresponding to the predetermined portion which was previously inserted into the content. According to various embodiments of the present disclosure, the terminal 100 may generate the metadata corresponding to the predetermined period by performing image processing on the content. According to various embodiments of the present disclosure, the terminal 100 may receive the metadata corresponding to the predetermined portion of the content from an external source, separately from the content.

According to various embodiments of the present disclosure, the content may include multimedia content. For example, the content may include, but is not limited to, education content, movie content, broadcasting content, and game content, and/or the like.

According to various embodiments of the present disclosure, the predetermined portion of the content indicates a reproduction portion of the content defined by a time period. The predetermined portion may be formed of at least one frame, at least one sequence, or at least one scene. However, various embodiments of the present disclosure are not limited thereto.

According to various embodiments of the present disclosure, the metadata corresponding to the predetermined portion may mean information used to reproduce the predetermined portion of the content. According to various embodiments of the present disclosure, the metadata may include at least one of information about the predetermined period (e.g., a time stamp, an index, or the like), ID information of at least one external device to reproduce the predetermined period, and capability information about a capability to be performed by the at least one external device. The metadata is described below with reference to FIGS. 4A and 4B.

FIGS. 4A and 4B illustrate configuration of metadata according to an embodiment of the present disclosure.

Referring to FIG. 4A, metadata 400 may include information 410 indicating a predetermined portion, and control information 420 for controlling the external device 200. The control information 420 may include ID information 421 of the external device 200 to reproduce the predetermined portion, capability information 422 about a capability to be performed by the external device 200, and additional information 423 about the capability.

Referring to FIG. 4B, in a case in which a speaker and a robot cleaner are used to reproduce a predetermined portion of content (e.g., Time Stamp: 930000), the metadata 400 that corresponds to the predetermined portion (e.g., Time Stamp: 930000) may include control information 420-1 about the speaker and control information 420-2 about the robot cleaner.

The control information 420-1 about the speaker may include ID information used to identify the speaker (e.g., device category: speaker), capability information about a capability to be performed by the speaker (e.g., a sound output), and additional information about the capability (e.g., data of sound to be output from the speaker).

In addition, the control information 420-2 about the robot cleaner may include ID information used to identify the robot cleaner (e.g., device category: robot cleaner), capability information about a capability to be performed by the robot cleaner (e.g., a start of cleaning), and additional information about the capability (e.g., auto-mode setting).

Referring back to FIG. 3, at operation S320, the terminal 100 may select at least one external device 200 to reproduce the predetermined portion of the content, based on the obtained metadata corresponding to the predetermined portion.

For example, as illustrated in FIG. 4B, when the control information 420-1 about the speaker and the control information 420-2 about the robot cleaner are included in the metadata 400 corresponding to the predetermined portion (e.g., Time Stamp: 930000), the terminal 100 may select the speaker and the robot cleaner as the external devices 200 to reproduce the predetermined portion.

The speaker and the robot cleaner may be previously connected to the terminal 100 before reproduction of the predetermined portion of the content. In addition, the speaker and the robot cleaner may be in a standby state in which the speaker and the robot cleaner may immediately perform a control command of the terminal 100.

For example, the terminal 100 may select at least one external device 200 that is to reproduce the predetermined portion and that is from among a plurality of external devices physically connected to the terminal 100. The physical connection may include active connection, passive connection, remote connection, wired connection, wireless connection, short-distance communication connection, or the like.

According to various embodiments of the present disclosure, the terminal 100 may select the external device 200 to reproduce the predetermined portion, and may scan the selected external device 200 in an UPnP way.

In a case in which the metadata corresponding to the predetermined portion does not include the ID information of the external device 200 but only includes capability information about a capability to be performed by the external device 200, the terminal 100 may select the at least one external device 200 by using a capability mapping table. The capability mapping table may be a table in which a particular capability is mapped with the ID information of the external device 200 that performs the particular capability.

For example, when the metadata corresponding to the predetermined portion includes only capability information indicating "sound output", the terminal 100 may select by using the capability mapping table a 'speaker' that performs "sound output" as the external device 200 to reproduce the predetermined portion of the content.

At operation S330, the terminal 100 may transmit a control command to the selected external device 200. The terminal 100 may transmit the control command to the selected external device 200 via wired or wireless communication.

The terminal 100 may convert control information included in the metadata into the control command that matches a control protocol of the selected external device 200.

At operation S340, the terminal 100 may reproduce the predetermined portion of the content by interoperating with the selected external device 200. For example, the terminal 100 and the selected external device 200 may reproduce together the predetermined portion of the content. When the control command is transmitted to the selected external device 200, the terminal 100 may discontinue reproduction of the predetermined portion of the content, and when the terminal 100 receives a message corresponding to the control command from the selected external device 200, the terminal 100 may resume reproduction of the discontinued content.

Thus, the terminal 100 may provide a new experience of content reproduction to a user by interoperating with the selected external device 200.

Figure 5:
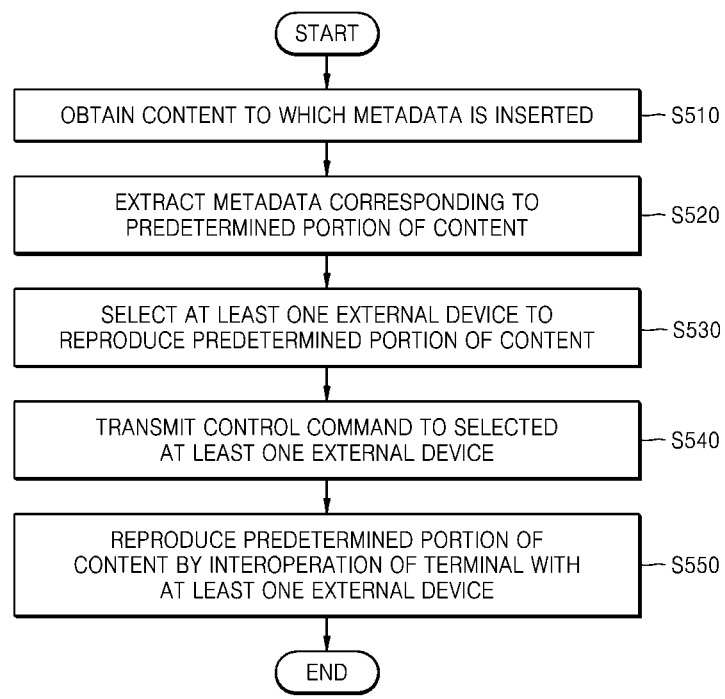
FIG. 5 is a flowchart of a method of obtaining metadata, according to an embodiment of the present disclosure.

FIG. 5 is a flowchart of a method of obtaining metadata, according to an embodiment of the present disclosure.

Referring to FIG. 5, at operation S510, the terminal 100 may obtain content to which metadata is inserted.

For example, the terminal 100 may receive from an external source the content to which the metadata is inserted by a content producer or a content provider. In addition, the terminal 100 may obtain from a memory content to which metadata is inserted directly by a user who uses the content. A method of inserting metadata by the content producer, the content provider, or the user will be described in detail with reference to FIG. 6.

At operation S520, the terminal 100 may extract the metadata corresponding to a predetermined portion which was previously inserted into the content.

The terminal 100 may extract the metadata corresponding to the predetermined portion before the content is reproduced. According to various embodiments of the present disclosure, when the terminal 100 receives a content reproduction start command, the terminal 100 may recognize a plurality of pieces of metadata corresponding to all portions of the content and may perform pre-processing in an early portion during reproduction of the content. According to various embodiments of the present disclosure, the terminal 100 may extract the metadata corresponding to the predetermined portion while the content is reproduced.

According to various embodiments of the present disclosure, the terminal 100 may receive a metadata file with respect to all portions of the content, separately from the content.

At operation S530, the terminal 100 may select at least one external device 200 to reproduce the predetermined portion of the content, based on the extracted metadata.

At operation S540, the terminal 100 may transmit a control command to the at least one external device 200. For example, at operation S540, the terminal may transmit the control command to the selected at least one external device 200.

At operation S550, the terminal 100 may reproduce the predetermined portion of the content by interoperating with the at least one external device 200.

Operations S530 through S550 correspond to operations S320 through S340 of the flowchart in FIG. 3, and thus, detailed descriptions thereof are omitted here.

Figure 6:
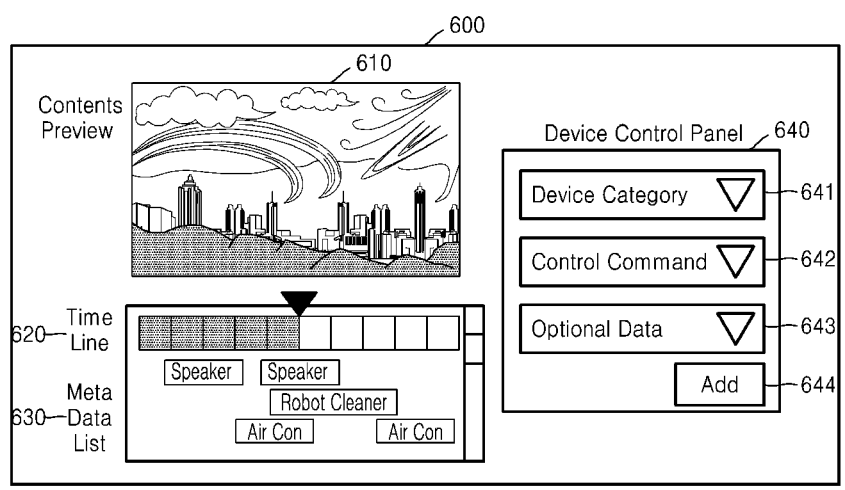
FIG. 6 illustrates a Graphical User Interface (GUI) for inserting metadata, according to an embodiment of the present disclosure.

FIG. 6 illustrates a Graphical User Interface (GUI) for inserting metadata 600, according to an embodiment of the present disclosure.

Referring to FIG. 6, the GUI for inserting metadata 600 may include a preview field 610 for displaying a preview image corresponding to a predetermined portion of content, a time line field 620 for selecting the predetermined portion, a metadata list field 630 for displaying a list of metadata corresponding to the predetermined portion, and a control field 640 for adding control information.

A content producer, a content provider, or a content user may generate the metadata corresponding to the predetermined portion of the content by using the GUI for inserting metadata 600. For example, the content user may select the predetermined portion of the content in the time line field 620. Thereafter, the preview field 610 may display the preview image corresponding to the predetermined portion selected by the content user.

The content user may input control information corresponding to the predetermined portion via the control field 640. For example, the content user may select a type of at least one external device to reproduce the predetermined portion via a device category 641, may input a setting for a capability to be performed by the selected at least one external device via a control command 642 and may input optional data 643, and then may select an 'add' button 644. Thereafter, the metadata corresponding to the predetermined portion may be generated and added to the metadata list field 630.

Figure 7:
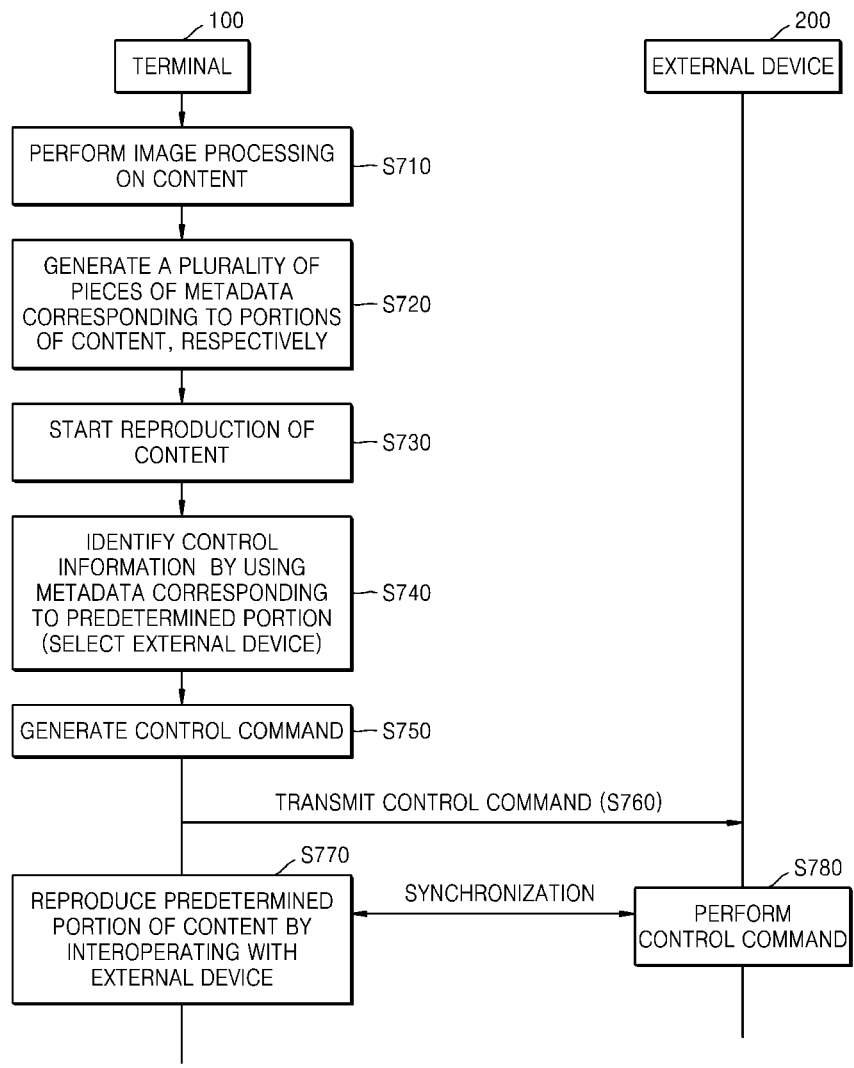
FIG. 7 is a flowchart of a method of generating metadata, according to an embodiment of the present disclosure.

FIG. 7 is a flowchart of a method of generating metadata, according to an embodiment of the present disclosure.

Figure 8:
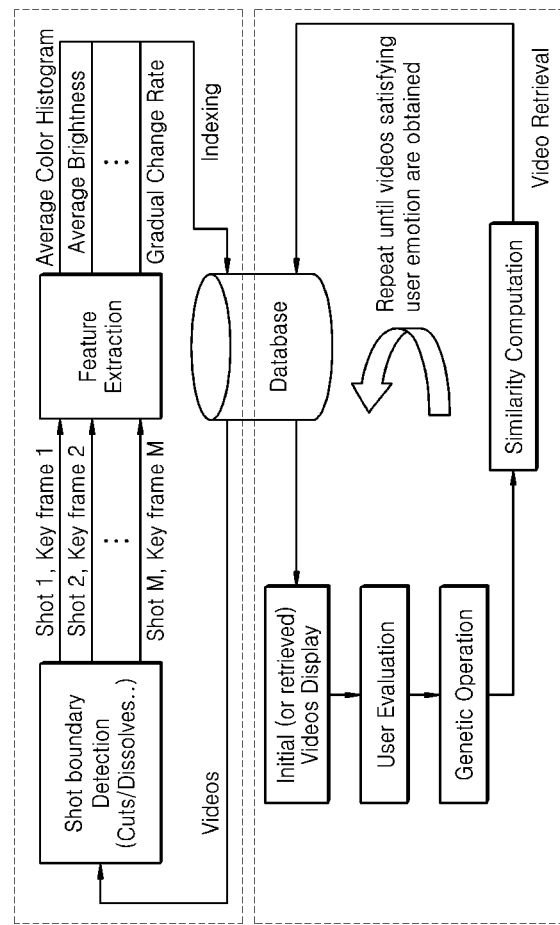
FIG. 8 illustrates an example of an image processing algorithm according to an embodiment of the present disclosure.

At operation S710, the terminal 100 may perform image processing on content. The terminal 100 may perform image processing on the content by using various image processing algorithms (e.g., as illustrated in FIG. 8).

The terminal 100 may recognize an atmosphere, a feeling, a device, or the like that appears in a predetermined portion of the content by performing image processing on the content.

According to various embodiments of the present disclosure, the terminal 100 may analyze audio data included in the content.

At operation S720, the terminal 100 may generate a plurality of pieces of metadata corresponding to portions of the content, respectively, based on a result of the image processing. For example, the terminal 100 may previously generate the plurality of pieces of metadata corresponding to all of the portions of the content before the content is reproduced. The terminal 100 may previously turn on a power of at least one external device 200 to reproduce the content or may previously establish communication with the at least one external device 200, based on the plurality of pieces of metadata corresponding to the all portions of the content.

The terminal 100 may generate metadata based on a type of the at least one external device 200 connected to the terminal 100. For example, in a case in which a device A, a device B, and a device C are connected to the terminal 100 via wired or wireless communication, the terminal 100 may generate metadata so as to use the device A, the device B, and the device C when a predetermined portion of content is reproduced. For example, the terminal 100 may not include control information about a device D, which is not connected to the terminal 100, in the metadata. In addition, when the terminal 100 detects connection with another external device during reproduction of the content, the terminal 100 may generate metadata corresponding to the predetermined portion, in consideration of the connected other external device.

The terminal 100 may insert the metadata generated by performing image processing into the content, or may manage the metadata as a separate metadata file, separately from the content.

At operation S730, the terminal 100 may start reproduction of the content.

At operation S740, the terminal 100 may identify control information by using the metadata corresponding to the predetermined portion of the content. For example, the terminal 100 may identify the previously-generated metadata corresponding to the predetermined portion while the terminal 100 reproduces the content.

The terminal 100 may select the at least one external device 200 to reproduce the predetermined portion of the content, and may identify, based on the control information included in the metadata, capability information about a capability operation to be performed by the at least one external device 200.

At operation S750, the terminal 100 may generate a control command by using the control information included in the metadata corresponding to the predetermined portion of the content. For example, the terminal 100 may convert the capability information about the capability to be performed by the at least one external device 200, which is included in the control information, into a control command matching a control protocol of the at least one external device 200.

At operation S760, the terminal 100 may transmit the control command to the at least one external device 200. The control protocol may include the capability information about the capability (e.g., a sound output, and/or the like) to be performed by the at least one external device 200, temporal information about a time (e.g., after 1 minute, and/or the like) when the capability is to be performed by the at least one external device 200, or the like.

At operation S770, the terminal 100 may reproduce the predetermined portion of the content by interoperating with the at least one external device 200. For example, at operation S780, when the terminal reproduces the predetermined portion of the content at S770, the at least one external device 200 may perform the control command.

FIG. 8 illustrates an example of an image processing algorithm according to an embodiment of the present disclosure.

Referring to FIG. 8, the terminal 100 may divide a video clip, which is commonly expressed as a scene, in units of shots, may obtain a key frame from each of the shots, and then may extract 5 characteristics of an average color histogram, an average brightness, an average edge histogram, an average shot duration, and a gradual shot change rate from the shots in the scene.

A color is the most basic characteristic that expresses contents of a video, and is effective in expressing a particular feeling. For example, a warm mood image mainly includes red-component elements, and a cold mood image mainly includes blue-component elements. In a case of a video, an "action" scene generally includes red and purple colors, and a "quiet" scene generally includes blue, green, and white colors.

A bright mood image expresses light and happy feelings, whereas a dark image expresses rigid, heavy, and gloomy feelings. In the video, the "quiet" scene mainly includes information about bright-tone colors.

A gloomy mood image includes a small number of main edges as the image is entirely blurred, and a happy mood image includes a relatively great number of main edges.

In "action", "exciting", scenes or the like, shots are rapidly changed, and in "quiet", "relaxed", and "happy" scenes or the like a length of each shot is long and variation in each shot is not great.

In the video, a boundary between shots due to a gradual change may arouse a particular feeling. The "quiet" scene may generally include variation of gradual shots such as dissolve.

According to various embodiments of the present disclosure, the terminal 100 may analyze a feeling of each shot by using the extracted 5 characteristics (e.g., the average color histogram, the average brightness, the average edge histogram, the average shot duration, and the gradual shot change rate).

According to various embodiments of the present disclosure, the terminal 100 may extract a characteristic element from each shot by using an edge detection method, a frequency-based method, a template-based method, or the like. For example, the terminal 100 may recognize that a scene includes a vehicle by using details such that the vehicle is vertically and horizontally symmetrical, a zone below the vehicle is darkly shaded, a rear portion of the vehicle generally has a quadrangular shape with many edges, or the like.

According to various embodiments of the present disclosure, the terminal 100 may generate the metadata by using various image processing algorithms, other than the aforementioned image processing algorithm. Because the image processing algorithms are well known to ordinary skilled in the art, detailed descriptions thereof are omitted here.

Figure 9:
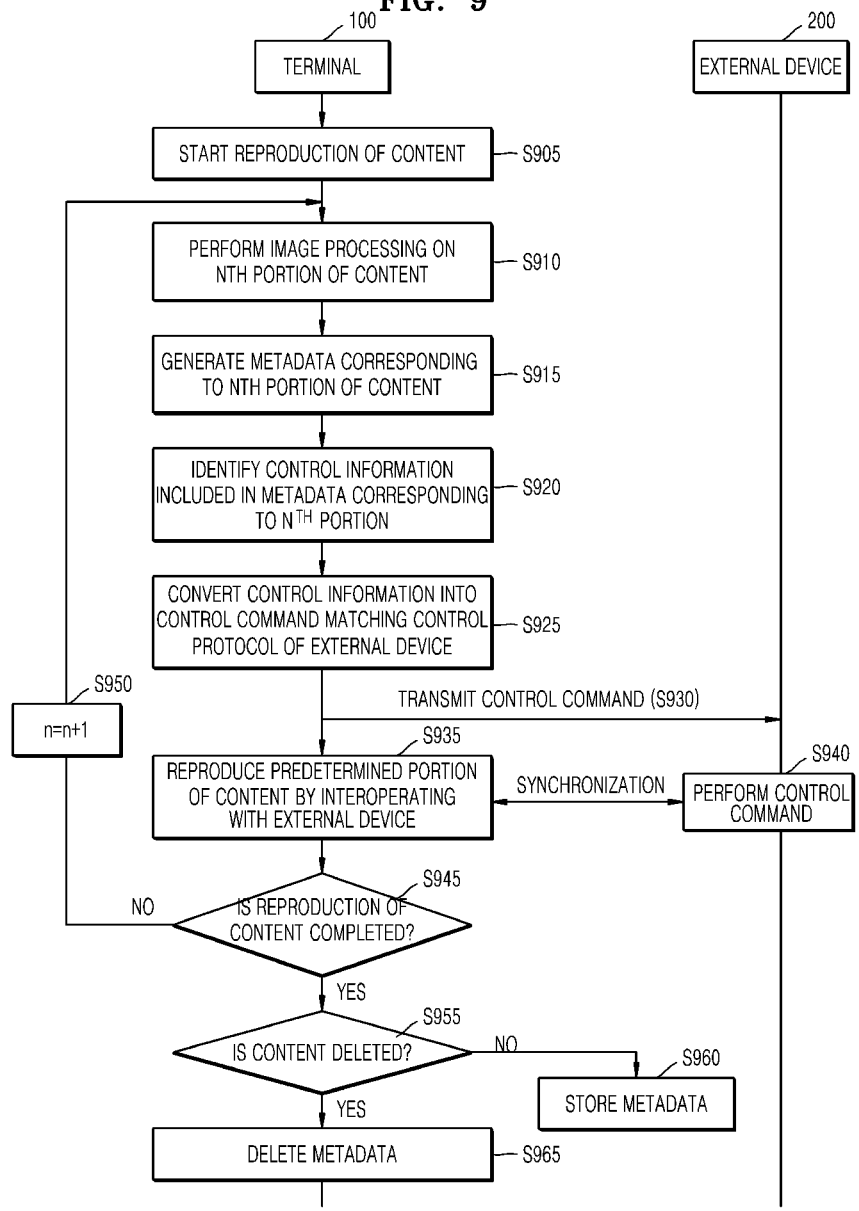
FIG. 9 is a flowchart of a method of generating metadata corresponding to a predetermined portion of content, according to an embodiment of the present disclosure.

FIG. 9 is a flowchart of a method of generating metadata corresponding to a predetermined portion of content according to an embodiment of the present disclosure.

Referring to FIG. 9, at operation S905, the terminal 100 may start reproduction of the content. For example, when the terminal 100 receives a content reproduction start command from a user, the terminal may start reproduction of the content by using a content reproduction application.

At operation S910, the terminal 100 may perform image processing on an $n^{th}$ portion of the content. For example, the terminal 100 may perform image processing on a predetermined portion of the content in real-time, separately from reproduction of the content.

By performing image processing on the $n^{th}$ portion, the terminal 100 may extract device information about at least one external device 200 related to the $n^{th}$ portion, capability information about a capability to be performed by the at least one external device 200 during reproduction of the $n^{th}$ portion, or the like.

At operation S915, the terminal 100 may generate metadata corresponding to the $n^{th}$ portion of the content. For example, the terminal 100 may generate the metadata corresponding to the $n^{th}$ portion by using the device information about the at least one external device 200 related to the $n^{th}$ portion and the capability information about the capability to be performed by the at least one external device 200 during reproduction of the $n^{th}$ portion which are extracted by performing image processing on the $n^{th}$ portion.

At operation S920, the terminal 100 may identify control information included in the metadata corresponding to the $n^{th}$ portion.

At operation S925, the terminal 100 may convert the control information into a control command that matches a control protocol of the at least one external device 200.

At operation S930, the terminal 100 may transmit the control command to the at least one external device 200. According to various embodiments of the present disclosure, the terminal 100 may transmit the control command to the at least one external device 200 via short-distance communication.

At operation S935, the terminal 100 may reproduce a predetermined portion of the content by interoperating with the at least one external device 200.

At operation S940, the at least one external device 200 may perform the control command. For example, the terminal 100 and the at least one external device 200 may reproduce together the predetermined portion of the content.

Operations S920 through S940 correspond to operations S740 through S780 of the flowchart in FIG. 7, and thus, detailed descriptions thereof are omitted here.

At operation S945, the terminal 100 may check (e.g., determine) whether reproduction of the content is complete.

If the terminal 100 determines that reproduction of the content is not complete at operation S945, then the terminal 100 may proceed to operation S950 at which the terminal 100 may perform image processing on a next portion (e.g., an $n+1^{th}$ portion) and then may generate metadata corresponding to the next portion (the $n+1^{th}$ portion). For example, operations S910 through S945 may be repeatedly performed.

In contrast, if the terminal 100 determines that reproduction of the content is complete at operation S945, then the terminal 100 may proceed to operation S955 at which the terminal 100 may check (e.g., determine) whether the content is deleted according to a deletion request by the user.

If the terminal 100 determines that the content is not deleted at operation S955, then the terminal 100 may proceed to operation S960 at which the terminal 100 may store the metadata generated at operations S910 through S915. In this case, the terminal 100 may store the metadata by inserting the metadata into the content or may store the metadata as a separate metadata file.

In contrast, if the terminal 100 determines that reproduction of the content is complete at operation S945, and that the content is deleted at operation S955, then the terminal 100 may proceed to operation S965 at which the terminal 100 may delete the metadata generated at operations S910 through S915 and may therefore efficiently manage a memory.

According to various embodiments of the present disclosure, regardless of deletion of the content, when reproduction of the content is complete, the terminal 100 may delete the metadata generated by performing image processing.

Figure 10:
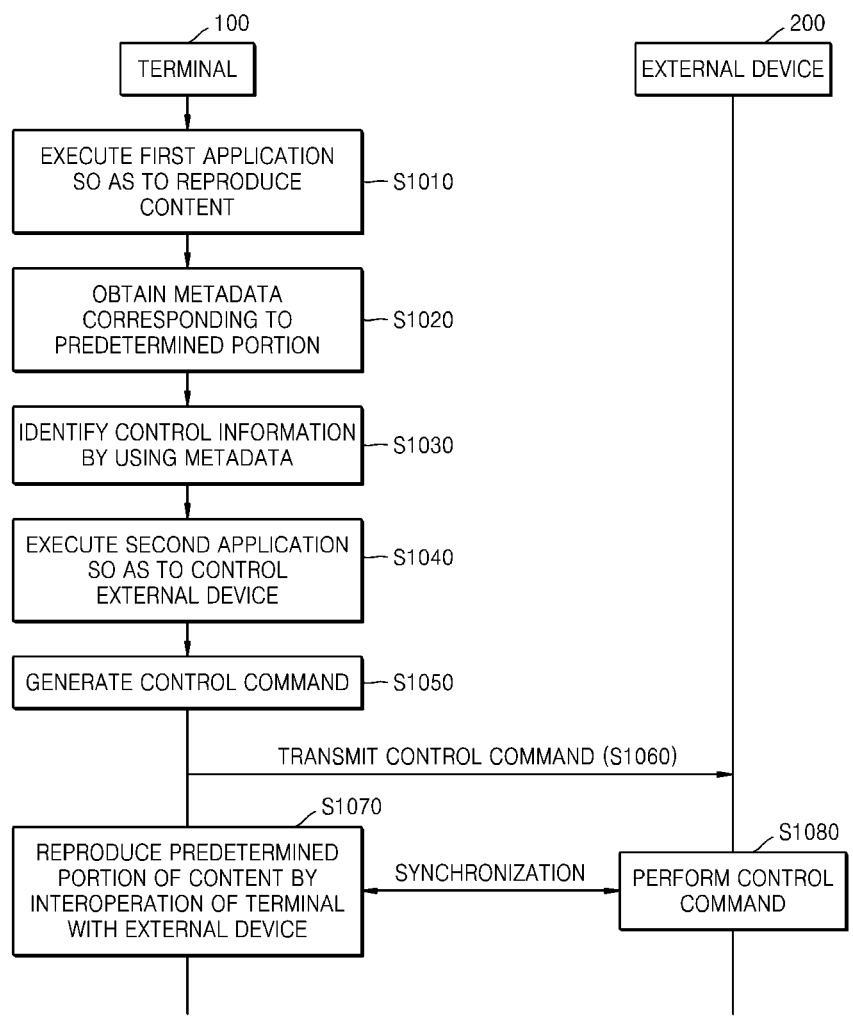
FIG. 10 is a flowchart of a method of executing an application, according to an embodiment of the present disclosure.

FIG. 10 is a flowchart of a method of executing an application according to an embodiment of the present disclosure.

At operation S1010, the terminal 100 may execute a first application so as to reproduce content.

At operation S1020, the terminal 100 may obtain metadata corresponding to a predetermined portion of the content via the first application. The first application may extract the metadata corresponding to the predetermined portion, which is inserted into the content, or may generate the metadata corresponding to the predetermined portion by performing image processing on the content. In addition, the first application may request and receive the metadata corresponding to the predetermined portion from an external server.

At operation S1030, the terminal 100 may identify control information included in the metadata corresponding to the predetermined portion via the first application. The first application may transmit to a second application the control information included in the metadata corresponding to the predetermined portion.

At operation S1040, the terminal 100 may execute the second application so as to control at least one external device 200.

At operation S1050, the terminal 100 may generate a control command by using the second application. The second application may have information about a control protocol of the at least one external device 200. Thus, the second application may convert the control information received from the first application into the control command that matches the control protocol of the at least one external device 200.

At operation S1060, the terminal 100 may transmit the control command to the at least one external device 200.

At operation S1070, the terminal 100 may reproduce the predetermined portion of the content by interoperating with the at least one external device 200. For example, at operation S1080, the at least one external device 200 may perform the control command when the terminal 100 reproduces the predetermined portion of the content.

According to various embodiments of the present disclosure, the first application and the second application may be sub-applications of a main application. In addition, the first application and the second application may be embodied as separate function blocks in one application.

Figure 11A:
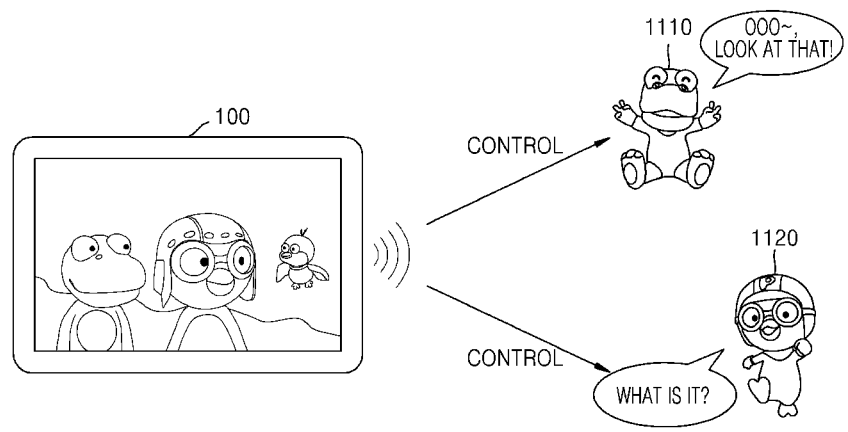
FIGS. 11A and 11B illustrate diagrams related to a method of reproducing animation content by interoperation of a terminal with an external device, according to an embodiment of the present disclosure.
Figure 11B:
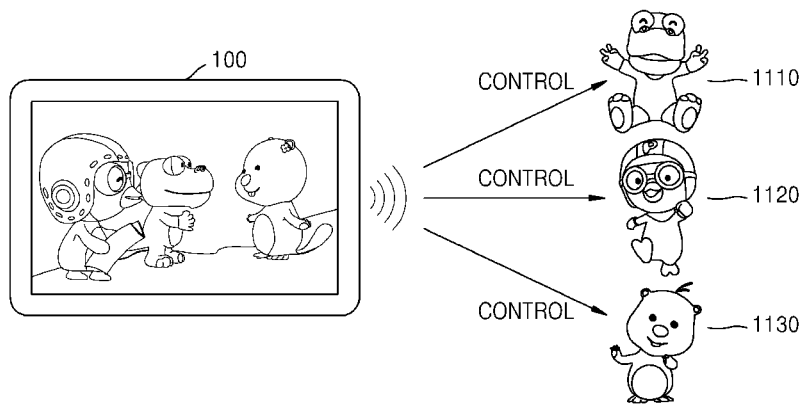

FIGS. 11A and 11B illustrate diagrams related to a method of reproducing animation content by interoperation of a terminal with an external device according to an embodiment of the present disclosure.

Referring to FIG. 11A, the terminal 100 may reproduce the animation content. The terminal 100 may obtain metadata corresponding to an $n^{th}$ portion of the animation content and may identify control information included in the metadata.

For example, when an X character and a Y character appear in the $n^{th}$ portion of the animation content, the metadata corresponding to the $n^{th}$ portion may include the metadata for controlling an X character doll 1110 and a Y character doll 1120.

The terminal 100 may transmit control commands to the X character doll 1110 and the Y character doll 1120, respectively, based on the control information. Thereafter, the terminal 100, the X character doll 1110, and the Y character doll 1120 may reproduce together the $n^{th}$ portion of the animation content.

Referring to FIG. 11B, the terminal 100 may reproduce an $n+1^{th}$ portion of the animation content. In this case, the terminal 100 may obtain metadata corresponding to the $n+1^{th}$ portion and may identify control information included in the obtained metadata. In a case in which a Z character as well as the X character and the Y character appear in the $n+1^{th}$ portion of the animation content, the metadata corresponding to the $n+1^{th}$ portion may include the control information for controlling the X character doll 1110, the Y character doll 1120, and a Z character doll 1130.

The terminal 100 may transmit control commands to the X character doll 1110, the Y character doll 1120, and the Z character doll 1130, respectively, based on the control command. Thereafter, the terminal 100, the X character doll 1110, the Y character doll 1120, and the Z character doll 1130 may reproduce together the $n+1^{th}$ portion of the animation content.

Therefore, according to various embodiments of the present disclosure, the terminal 100 and character dolls appearing in scenes of the animation content may reproduce together the animation content.

Figure 12:
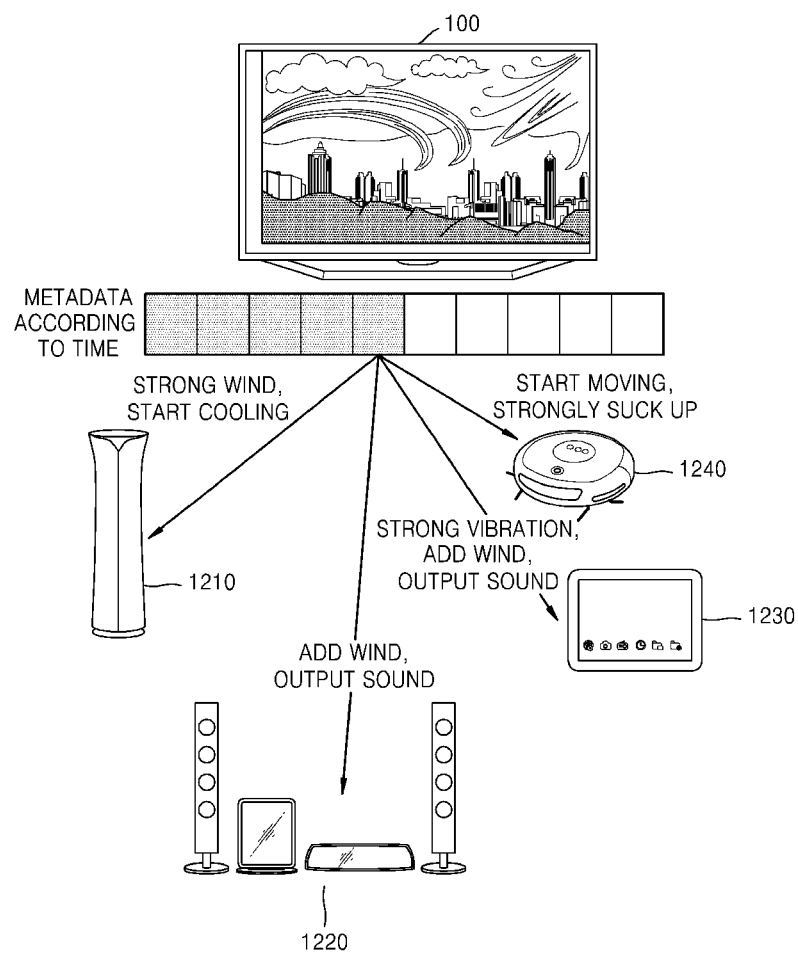
FIG. 12 is a diagram related to a method of reproducing movie content by interoperation of a terminal with an external device, according to an embodiment of the present disclosure.

FIG. 12 is a diagram related to a method of reproducing movie content by interoperation of a terminal with an external device according to an embodiment of the present disclosure.

Referring to FIG. 12, the terminal 100 may reproduce the movie content. The terminal 100 may generate metadata corresponding to a predetermined portion of the movie content by performing image processing on the movie content. For example, if the predetermined portion of the movie content includes a whirlwind scene, the terminal 100 may generate the metadata including a plurality of pieces of control information related to 'air conditioner 1210: start cooling', 'audio system 1220: output sound', 'tablet PC 1230: generate strong vibration and output sound', 'robot cleaner 1240: start moving and strongly suck up', or the like. In this case, the air conditioner 1210, the audio system 1220, the tablet PC 1230, and the robot cleaner 1240 may be previously connected to the terminal 100 in a wired or wireless manner.

Before the terminal 100 reproduces the predetermined portion of the movie content, the terminal 100 may transmit control commands to the air conditioner 1210, the audio system 1220, the tablet PC 1230, and the robot cleaner 1240, respectively. The control commands may include a plurality of pieces of capability information about capabilities to be performed by the air conditioner 1210, the audio system 1220, the tablet PC 1230, and the robot cleaner 1240, respectively.

Thereafter, when the terminal 100 reproduces the whirlwind scene, the air conditioner 1210, the audio system 1220, the tablet PC 1230, and the robot cleaner 1240 may perform the control commands, respectively, which are received from the terminal 100. Therefore, according to various embodiments of the present disclosure, the terminal 100 may provide lifelike reproduction of the movie content by interoperating with one or more external devices 200.

Figure 13:
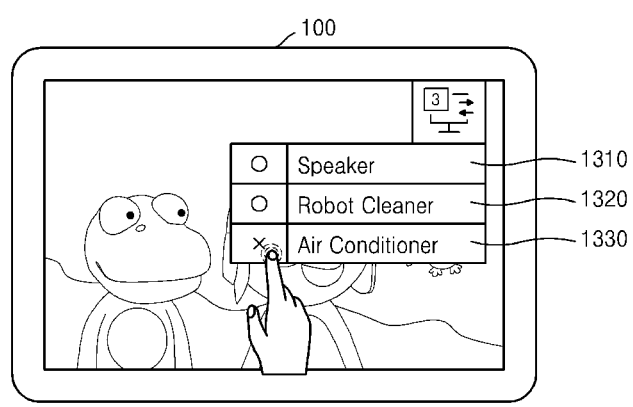
FIG. 13 illustrates an example of a GUI that displays a list of external devices connected to a terminal according to an embodiment of the present disclosure.

FIG. 13 illustrates an example of a GUI that displays a list of external devices connected to a terminal according to an embodiment of the present disclosure.

Referring to FIG. 13, according to a user request, the terminal 100 may display information (e.g., device ID values, capabilities, and/or the like) about the external devices connected to the terminal 100. For example, the terminal 100 may display via a GUI the list of the external devices connected to the terminal 100.

As illustrated in FIG. 13, when a speaker 1310, a robot cleaner 1320, and an air conditioner 1330 are wiredly or wirelessly connected to the terminal 100, the terminal 100 may provide an external-device list including ID information of each of the speaker 1310, the robot cleaner 1320, and the air conditioner 1330.

In this case, a user may select from the external-device list one or more external devices to be used for reproducing content and other external devices not to be used for reproducing content. For example, the user may set the speaker 1310 and the robot cleaner 1320 to be used for reproducing content, and set the air conditioner 1330 not to be used for reproducing content.

In this case, the terminal 100 may transmit control commands only to the speaker 1310 and the robot cleaner 1320 that are selected by the user to be used for reproducing content, and may not transmit a control command to the air conditioner 1330.

In addition, when the terminal 100 generates metadata by performing image processing, the terminal 100 may generate the metadata including control information only about the speaker 1310 and the robot cleaner 1320.

Figure 14:
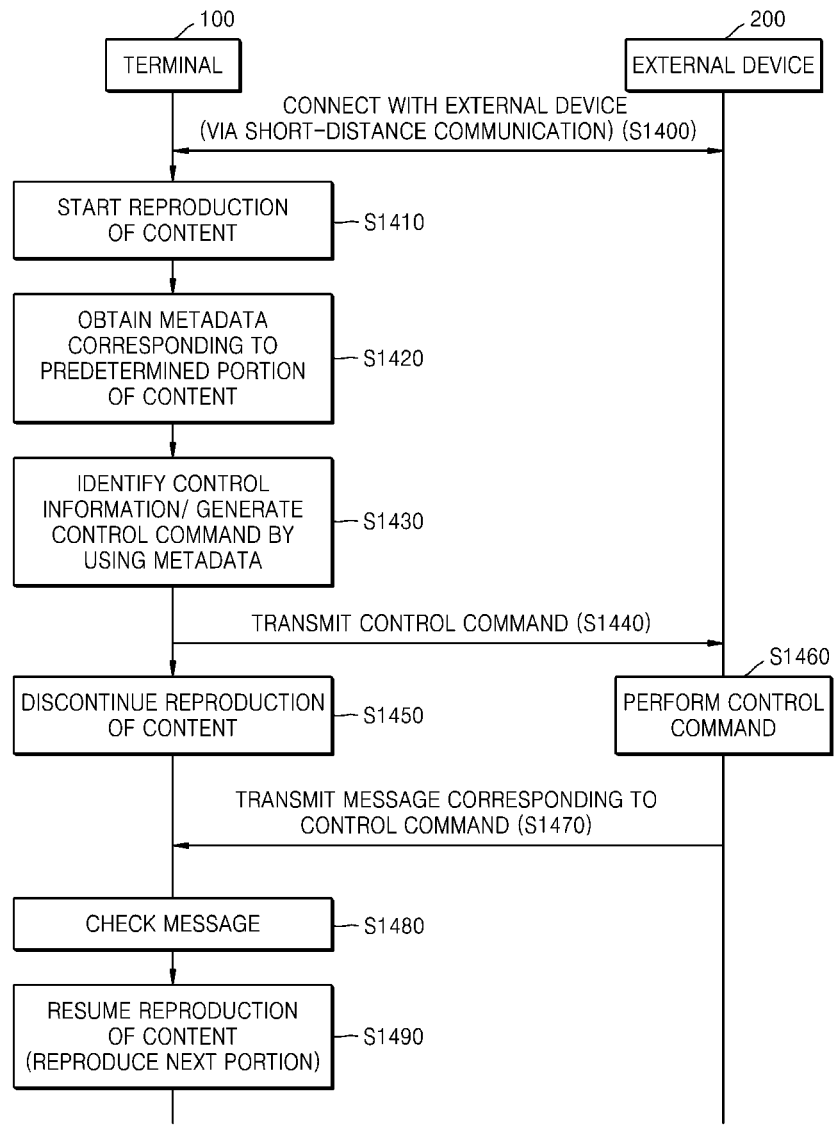
FIG. 14 is a flowchart of a method of reproducing content by interoperation of a terminal with at least one external device, according to an embodiment of the present disclosure.

FIG. 14 is a flowchart of a method of reproducing content by interoperation of a terminal with at least one external device according to an embodiment of the present disclosure.

At operation S1400, the terminal 100 and the at least one external device 200 may communicate with each other via short-distance communication. For example, the terminal 100 and the at least one external device 200 may communicate with each other via Wi-Fi or Bluetooth. For example, at operation S1400, the terminal 100 may connect with at least one external device 200.

At operation S1410, the terminal 100 may start reproduction of the content in response to a user input.

At operation S1420, the terminal 100 may obtain metadata corresponding to a predetermined portion of the content.

At operation S1430, the terminal 100 may identify control information by using the metadata. For example, the terminal 100 may identify the control information included in the metadata corresponding to the predetermined portion of the content during reproduction of the content. By referring to the control information included in the metadata, the terminal 100 may select the at least one external device 200 to reproduce the predetermined portion of the content, and may generate a control command by using capability information about a capability to be performed by the at least one external device 200.

At operation S1440, the terminal 100 may transmit the control command to the at least one external device 200.

At operation S1450, the terminal 100 may discontinue reproduction of the content. For example, when the control command is transmitted to the at least one external device 200, the terminal 100 may discontinue reproduction of the content.

According to various embodiments of the present disclosure, the control command may be, but is not limited to, a command for controlling the at least one external device 200 to display a question included in the content or a command for controlling the at least one external device 200 to set itself for reproducing content by using a setting value included in the content.

At operation S1460, the at least one external device 200 may execute the control command received from the terminal 100.

According to various embodiments of the present disclosure, operations S1450 and S1460 may be simultaneously performed or operation S1460 may be performed before operation S1450.

At operation S1470, the terminal 100 may receive a message corresponding to the control command from the at least one external device 200. The message corresponding to the control command may include a response message with respect to the question included in the content, a setting completion message, or the like.

At operation S1480, the terminal 100 may check the message received from the at least one external device 200.

At operation S1490, the terminal 100 may resume reproduction of the discontinued content. For example, when the terminal 100 receives the message corresponding to the control command from the at least one external device 200, the terminal 100 may resume reproduction of the discontinued content.

According to various embodiments of the present disclosure, at operation S1480, according to contents of the message, the terminal 100 may not resume reproduction of the discontinued content but may re-transmit a control command to the at least one external device 200.

Figure 15:
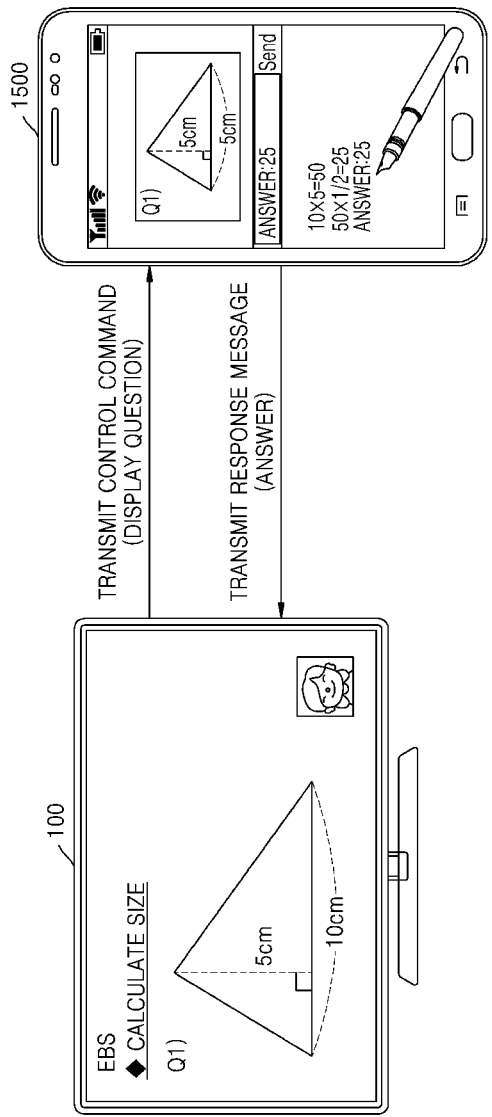
FIGS. 15A and 15B illustrate screens that reproduce education content, according to an embodiment of the present disclosure.
Figure 16:
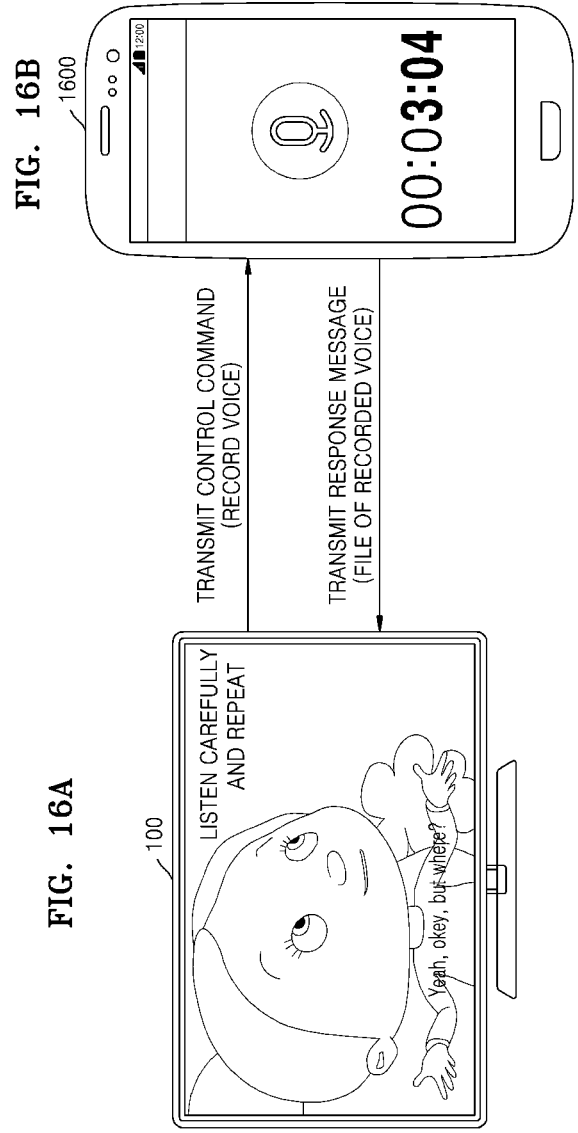
FIGS. 16A and 16B illustrate screens that reproduce education content, according to an embodiment of the present disclosure.
Figure 17:
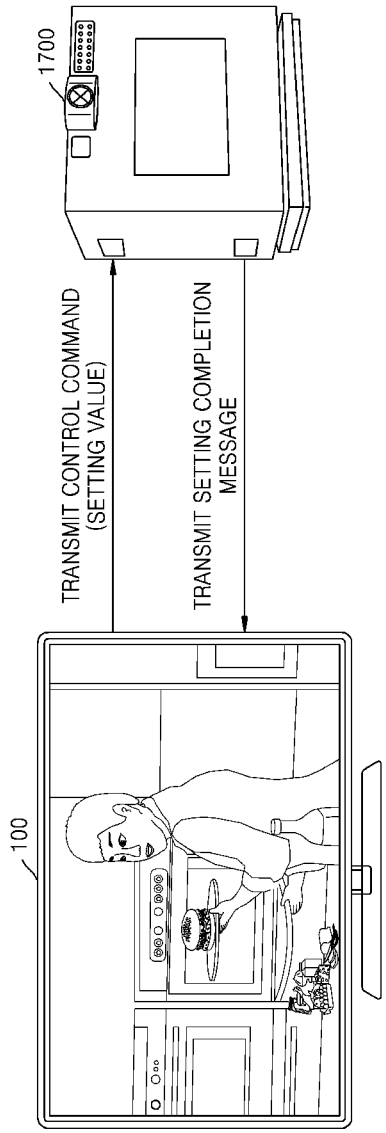
FIGS. 17A and 17B illustrate screens that reproduce cooking class content while a terminal interoperates with an external device, according to an embodiment of the present disclosure.

Hereinafter, a method of reproducing, by the terminal 100, a predetermined portion of content by interoperation of the terminal 100 with the at least one external device 200 will now be described in detail with reference to FIGS. 15 through 17.

FIGS. 15A and 15B illustrate screens that reproduce education content according to an embodiment of the present disclosure.

Referring to FIG. 15A, the terminal 100 may reproduce the education content. The terminal 100 may obtain metadata corresponding to a predetermined portion of the education content, and may identify control information included in the metadata. For example, in a case in which the predetermined portion of the education content is a portion in which a user directly solves a mathematical question, the metadata corresponding to the predetermined portion may include the control information for controlling a portable terminal 1500 of the user to display the mathematical question.

The terminal 100 may select the portable terminal 1500 as an external device to reproduce the predetermined portion of the education content, and may transmit a control command to the selected portable terminal 1500 so as to control the portable terminal 1500 to display the mathematical question. The terminal 100 may discontinue reproduction of the education content until the terminal 100 receives a response message from the portable terminal 1500 of the user.

Referring to FIG. 15B, the portable terminal 1500 of the user may display the mathematical question on the screen according to the control command from the terminal 100. In addition, the portable terminal 1500 may receive an input containing a response to the mathematical question from the user and may transmit the input response to the terminal 100 as the response message with respect to the control command.

The terminal 100 may check the response message (an answer) received from the portable terminal 1500. If the answer included in the response message is correct, the terminal 100 may resume reproduction of the discontinued education content. If the answer included in the response message is incorrect, the terminal 100 may transmit to the portable terminal 1500 a control command for controlling the portable terminal 1500 to display a GUI on the screen so as to request another answer.

Therefore, according to various embodiments of the present disclosure, the terminal 100 may reproduce the education content by interoperating with the portable terminal 1500 that is the external device connected to the terminal 100.

FIGS. 16A and 16B illustrate screens that reproduce education content according to an embodiment of the present disclosure.

Referring to FIG. 16A, the terminal 100 may reproduce foreign language education content. The terminal 100 may obtain metadata corresponding to a predetermined portion of the foreign language education content, and may identify control information included in the metadata. For example, if the predetermined portion of the education content is a portion in which a user listens to an output voice sound and repeats the voice sound, the metadata corresponding to the predetermined portion may include the control information for controlling a portable terminal 1600 of the user to record a voice sound of the user.

The terminal 100 may select the portable terminal 1600 as an external device to reproduce the predetermined portion of the foreign language education content, and may transmit a control command to the selected portable terminal 1600 so as to control the portable terminal 1600 to record and transmit the voice sound of the user. The terminal 100 may discontinue reproduction of the foreign language education content until the terminal 100 receives a response message from the portable terminal 1600 of the user.

Referring to FIG. 16B, the portable terminal 1600 may record the voice sound of the user according to the control command received from the terminal 100 and may transmit to the terminal 100 a file of the recorded voice sound as a response message with respect to the control command.

The terminal 100 may check the response message (e.g., the file of the recorded voice sound) received from the portable terminal 1600. The terminal 100 may compare the recorded voice sound included in the response message with the output voice sound of the terminal 100. For example, the terminal 100 may compare a pattern, a speed, a pitch, or the like of the voices.

If a difference between the recorded voice sound included in the response message and the output voice sound of the terminal 100 is within a certain tolerance, the terminal 100 may resume reproduction of the discontinued foreign language education content. If the difference between the recorded voice sound included in the response message and the output voice sound of the terminal 100 exceeds the certain tolerance, the terminal 100 may transmit to the portable terminal 1600 a control command for controlling the portable terminal 1600 to record again a voice sound of the user.

FIGS. 17A and 17B illustrate screens that reproduce cooking class content while a terminal interoperates with an external device according to another embodiment of the present disclosure.

Referring to FIG. 17A, the terminal 100 may reproduce the cooking class content. The terminal 100 may obtain metadata corresponding to a predetermined portion of the cooking class content and may identify control information included in the metadata. For example, in a case in which the predetermined portion of the cooking class content is a portion in which a cook sets a temperature, time, and power of an oven so as to use the oven, the metadata corresponding to the predetermined portion may include the control information for controlling setting values of an oven 1700 of a user to be changed to values set by the cook.

The terminal 100 may select the oven 1700 as an external device to reproduce the predetermined portion of the cooking class content and may transmit a control command to the oven 1700 to change the setting values. Thereafter, the terminal 100 may discontinue reproduction of the cooking class content until the terminal 100 receives a response message from the oven 1700 of the user.

Referring to FIG. 17B, the oven 1700 of the user may change the setting values of a temperature, time, power, or the like to the values set by the cook, according to the control command from the terminal 100. Thereafter, the oven 1700 may transmit to the terminal 100 a setting completion message as the response message with respect to the control command.

The terminal 100 may check the response message (e.g., the setting completion message) received from the oven 1700. Thereafter, the terminal 100 may resume reproduction of the cooking class content. For example, the terminal 100 may reproduce the cooking class content from after the portion in which the cook sets the values of the oven.

FIG. 18 is a diagram of a content reproduction system according to an embodiment of the present disclosure.

Referring to FIG. 18, the content reproduction system may further include a gateway 300 as well as a terminal 100' and an external device 200'.

The terminal 100' and the external device 200' are the same as those described with reference to FIG. 1, and thus, only the gateway 300 will be described below.

The gateway 300 may include a home gateway, a wireless relay base station, or the like. For example, the gateway 300 may be a wired and wireless Internet router having an Internet sharing function. In addition, the gateway 300 may be an AP capable of performing wireless communication and wired communication or a wireless router capable of sharing an Internet service with an AP.

According to various embodiments of the present disclosure, the gateway 300 may be wiredly or wirelessly connected to the terminal 100'. In addition, the gateway 300 may be wiredly or wirelessly connected to the external device 200'. For example, the gateway 300 may be connected to at least one of external device 200'-1 to 200'-N.

The gateway 300 may generate metadata about content by performing image processing on the content. The gateway 300 may also manage information about a control protocol of the external device 200' and may generate a control command that matches the control protocol of the external device 200'. A method of reproducing content, the method being performed by the terminal 100' using the gateway 300, will be described in detail with reference to FIGS. 19 and 20.

Figure 19:
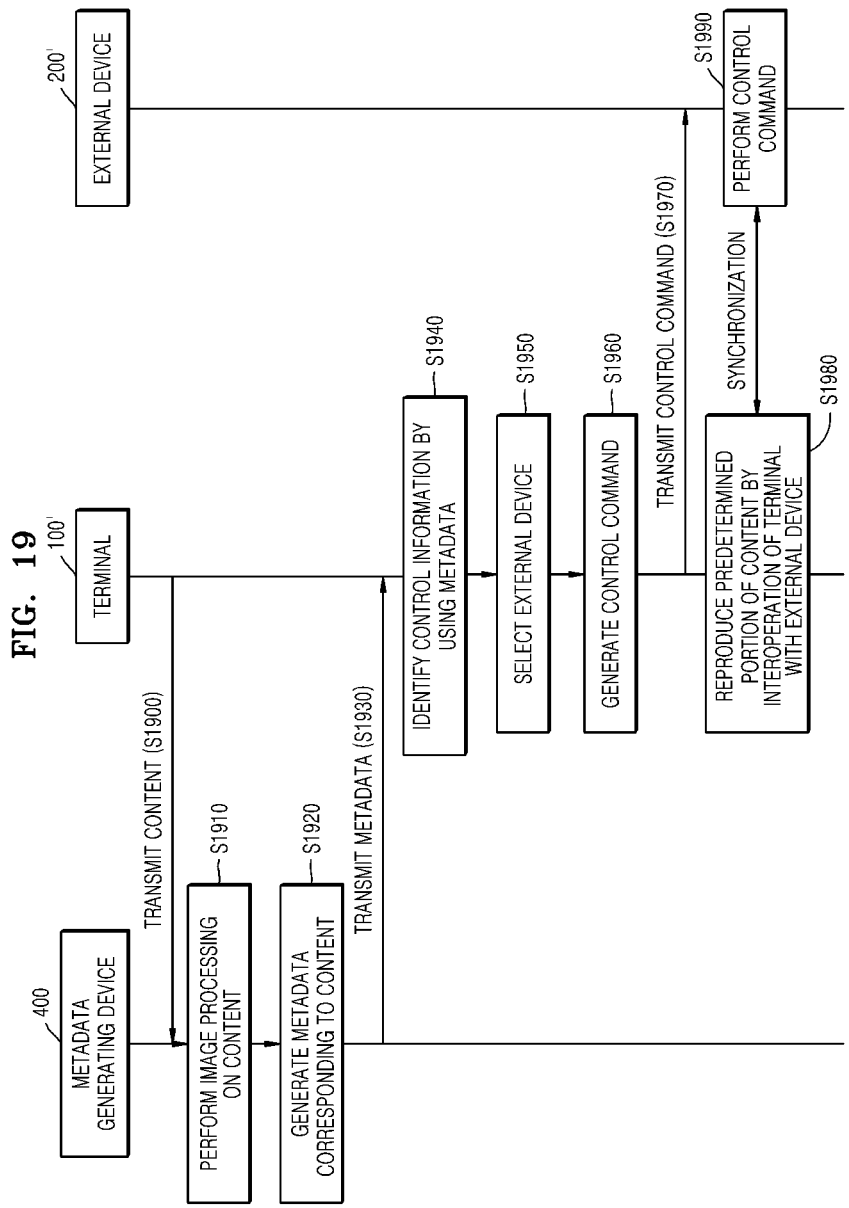
FIG. 19 is a flowchart of a method of obtaining metadata via a gateway, according to an embodiment of the present disclosure.

FIG. 19 is a flowchart of a method of obtaining metadata via a gateway according to an embodiment of the present disclosure.

Referring to FIG. 19, at operation S1900, the terminal 100' may transmit reproduction-target content to a metadata generating device 400 and may simultaneously request metadata about the content. According to various embodiments of the present disclosure, the metadata generating device 400 may be the gateway 300 or may be a device for generating only metadata separately from the gateway 300.

At operation S1910, the metadata generating device 400 may perform image processing on the content. The terminal 100' may perform image processing on the content by using various image processing algorithms (refer to the descriptions thereof in FIG. 8).

The metadata generating device 400 may recognize an atmosphere, a feeling, a device, or the like that appears in a predetermined portion of the content by performing image processing on the content.

According to various embodiments of the present disclosure, the metadata generating device 400 may analyze audio data included in the content.

At operation S1920, the metadata generating device 400 may generate based on a result of the image processing a plurality of pieces of metadata respectively corresponding to portions of the content. For example, by using device information about the external device 200' related to the $n^{th}$ portion and capability information about an operation to be performed by the external device 200' during reproduction of the content which are extracted by performing image processing on the $n^{th}$ portion, the metadata generating device 400 may generate metadata corresponding to an $n^{th}$ portion.

The metadata generating device 400 may insert the metadata, which is generated by performing image processing, directly into the content, or may separately manage from the content the metadata as a metadata file.

At operation S1930, the metadata generating device 400 may transmit the metadata to the terminal 100'.

At operation S1940, the terminal 100' may identify control information by using the metadata corresponding to the predetermined portion of the content. For example, the terminal 100' may identify the metadata corresponding to the predetermined portion while the terminal reproduces the content.

At operation S1950, the terminal 100' may select based on the control information the external device 200' to reproduce the predetermined portion of the content.

At operation S1960, the terminal 100' may generate a control command that matches a control protocol of the external device 200'.

At operation S1970, the terminal 100' may transmit the control command to the external device 200. According to various embodiments of the present disclosure, the terminal 100 may transmit the control command to the external device 200 via short-distance communication.

At operation S1980, the terminal 100' may reproduce the predetermined portion of the content by interoperating with the external device 200'.

At operation S1990, the external device 200' may also execute the control command. For example, the terminal 100' and the external device 200' may reproduce together the predetermined portion of the content.

Figure 20:
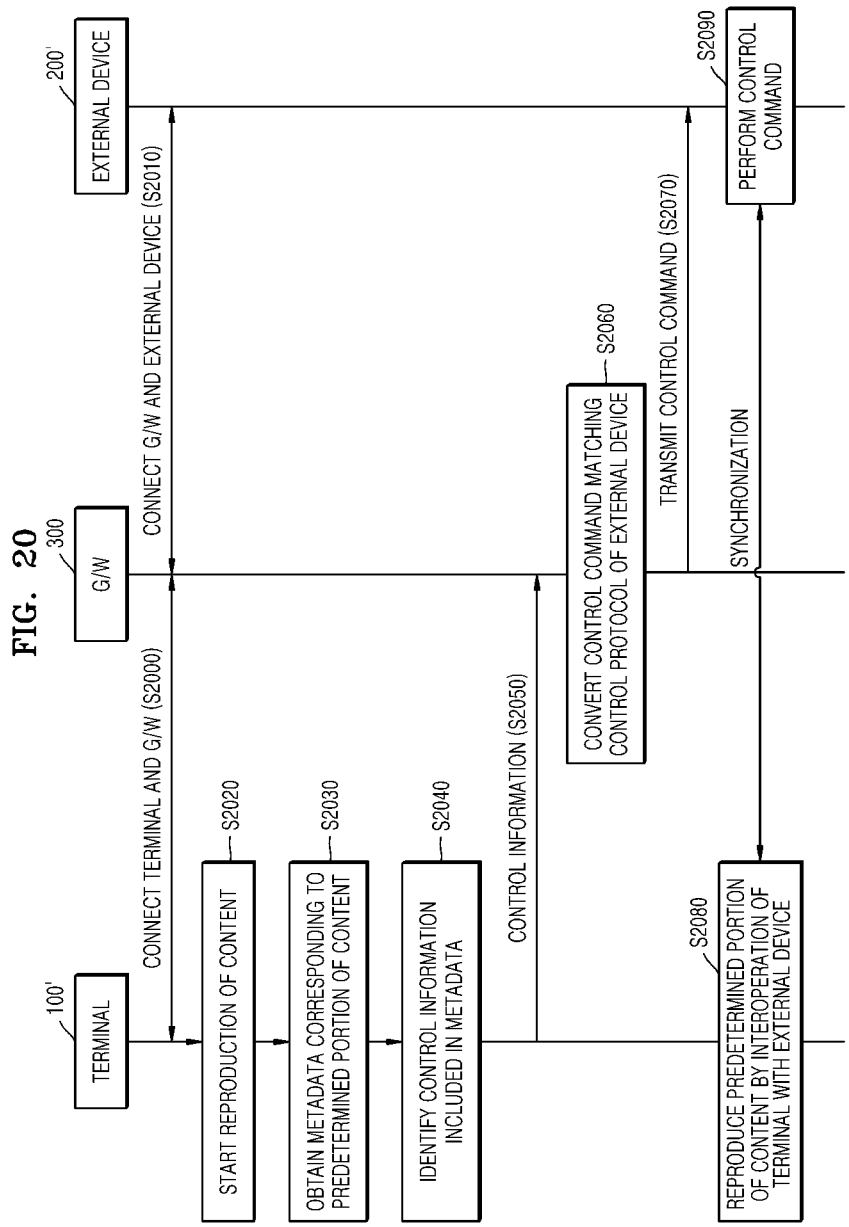
FIG. 20 is a flowchart of a method of converting a control command via a gateway, according to an embodiment of the present disclosure.

FIG. 20 is a flowchart of a method of converting a control command via a gateway according to an embodiment of the present disclosure.

Referring to FIG. 20, at operation S2000, the terminal 100' may be wiredly or wirelessly connected to the gateway 300.

At operation S2010, the external device 200' may be wiredly or wirelessly connected to the gateway 300.

At operation S2020, the terminal 100' may start reproduction of content.

At operation S2030, the terminal 100' may obtain metadata corresponding to a predetermined portion of the content. For example, the terminal 100' may extract the metadata corresponding to the predetermined portion, which was inserted into the content, or may generate the metadata corresponding to the predetermined portion by performing image processing on the content. In addition, the terminal 100' may request and receive the metadata corresponding to the predetermined portion from an external server.

At operation S2040, the terminal 100' may identify control information included in the metadata corresponding to the predetermined portion. For example, if the predetermined portion of the content corresponds to a scene in which an ambulance passes with the siren on, the metadata may include the control information of 'device category: robot cleaner, target capability: ambulance sound output and movement, additional data: ambulance sound data, etc'.

At operation S2050, the terminal 100' may transmit the identified control information to the gateway 300.

At operation S2060, the gateway 300 may identify the received control information and may select the external device 200' to reproduce the predetermined portion. Thereafter, the gateway 300 may convert the received control information into a control command that matches a control protocol of the external device 200'.

At operation S2070, the gateway 300 may transmit the control command to the external device 200.

At operation S2080, the terminal 100 may reproduce the predetermined portion by interoperating with the external device 200'. At operation S2090, the external device 200' may also execute the control command. For example, the terminal 100' and the external device 200' may reproduce together the predetermined portion of the content by interoperating with each other.

Figure 21:
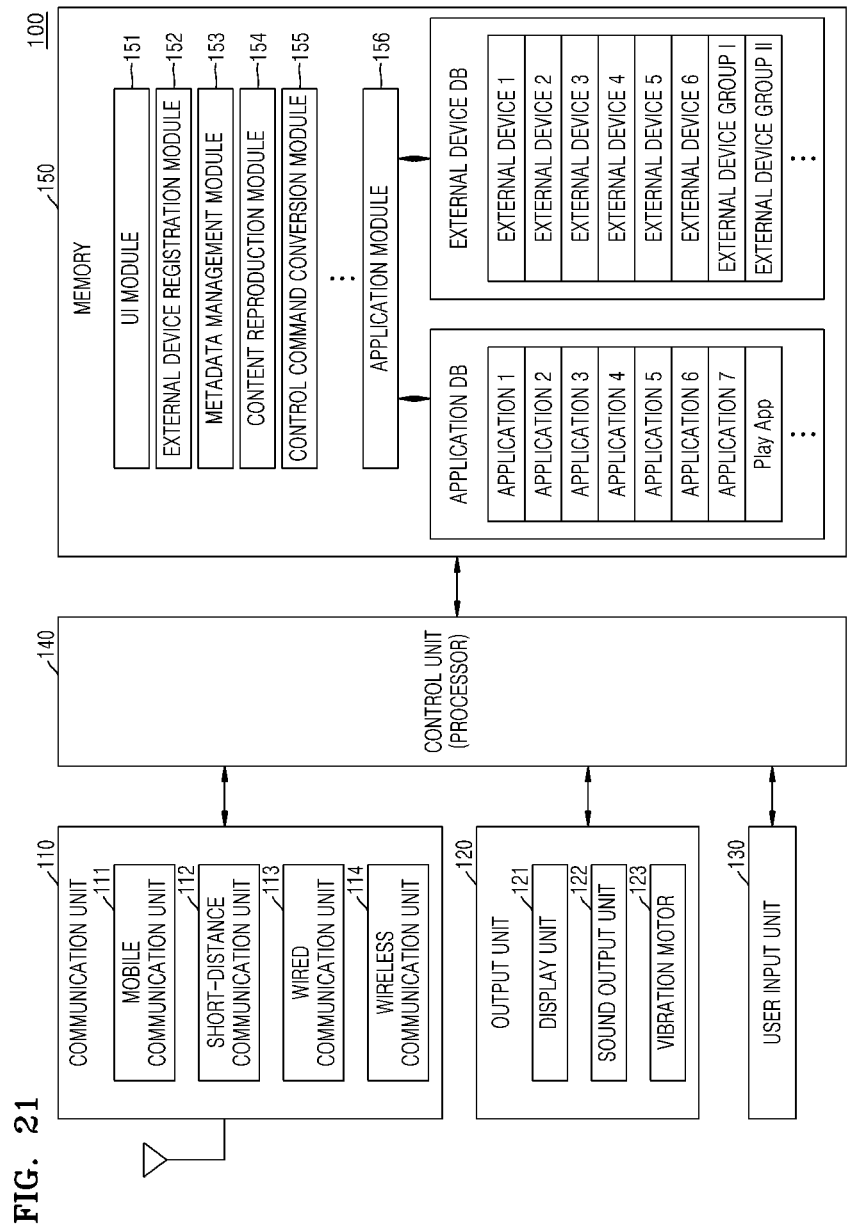
FIG. 21 is a block diagram of a terminal, according to an embodiment of the present disclosure.

FIG. 21 is a block diagram of a terminal according to an embodiment of the present disclosure.

Referring to FIG. 21, the terminal 100 may include a communication unit 110, an output unit 120, a user input unit 130, a control unit 140 (also referred as 'processor'), and a memory 150. However, not all shown elements are necessary elements. For example, according to various embodiments of the present disclosure, the terminal 100 may be embodied with more or less elements than the shown elements.

The communication unit 110 may include one or more elements for allowing communication between the terminal 100 and at least one external device 200 or communication between the terminal 100 and the gateway 300. For example, the communication unit 110 may include a mobile communication unit 111, a short-distance communication unit 112, a wired communication unit 113, a wireless communication unit 114, and/or the like.

Examples of short-distance communication may include, but is not limited to, Wi-Fi, Bluetooth, ZigBee, WFD, UWB, Infrared Data Association (IrDA), and BLE.

The communication unit 110 may transmit content to the gateway 300 that connects the terminal 100 and the at least one external device 200, and may simultaneously request metadata corresponding to a predetermined portion of content. Thereafter, the communication unit 110 may receive the metadata corresponding to the predetermined portion of the content from the gateway 300, wherein the metadata is generated by the gateway 300 by performing image processing on the content.

The communication unit 110 may transmit a control command to the at least one external device 200 via the gateway 300 that connects the terminal 100 and the at least one external device 200.

The output unit 120 may function to output an audio signal, a video signal, or a vibration signal and may include a display unit 121, a sound output unit 122, a vibration motor 123, or the like.

The display unit 121 displays and outputs information that is processed in the terminal 100. For example, the display unit 121 may display a content reproduction screen, a list of external devices connected to the terminal 100, a GUI for editing metadata, or the like.

According to various embodiments of the present disclosure, the display unit 121 may be formed as a touch screen. For example, when the display unit 121 and a touch pad form a mutual layer structure and then are formed as a touch screen, the display unit 121 may be used as both an output device and input device. The display unit 121 may include at least one of a Liquid Crystal Display (LCD), a Thin Film Transistor-Liquid Crystal Display (TFT-LCD), an organic light-emitting display device, a flexible display, a 3D display, an electrophoretic display, and the like. In addition, according to a type of the terminal 100, the terminal 100 may include at least two display units 121. The at least two display units 121 may face each other by using a hinge.

The sound output unit 122 may output audio data that is received from the communication unit 110 or is stored in the memory 150. The sound output unit 122 may also output a sound signal (e.g., a call signal receiving sound, a message receiving sound, or the like) related to capabilities performed by the terminal 100. The sound output unit 122 may include a speaker, a buzzer, or the like.

The vibration motor 123 may output a vibration signal. For example, the vibration motor 123 may output the vibration signal that corresponds to an output of the audio data (e.g., the call signal receiving sound, the message receiving sound, or the like) or video data. In addition, when a touch is input to the touch screen, the vibration motor 123 may output a vibration signal.

The user input unit 130 may be a unit by which a user inputs data so as to control the terminal 100. For example, the user input unit 130 may include a key pad, a dome switch, a touch pad (a touch capacitive type touch pad, a pressure resistive type touch pad, an infrared beam detecting type touch pad, a surface acoustic wave type touch pad, an integral strain gauge type touch pad, a Piezo effect type touch pad, or the like), a jog wheel, a jog switch, and the like. However, various embodiments of the present disclosure are not limited thereto.

The control unit 140 may generally control all operations of the terminal 100. For example, the control unit 140 may control the communication unit 110, the output unit 120, the user input unit 130, the memory 150, or the like by executing programs stored in the memory 150.

The control unit 140 may include an application processor (not shown) and a communication processor (not shown). The application processor may control execution of various applications stored in the memory 150. The communication processor may control various communication functions.

The control unit 140 may establish communication with the at least one external device 200 before the predetermined portion of the content is reproduced. For example, according to various embodiments of the present disclosure, the terminal 100 may previously scan the at least one external device 200 and may therefore rapidly reproduce the predetermined portion of the content without buffering.

The memory 150 may store a program to process and to control the control unit 140, or may store a plurality of pieces of data (e.g., multimedia content, device information about the at least one external device 200, an application related to the at least one external device 200, information about the control protocol of the at least one external device 200, and/or the like) that are input/output.

The memory 150 may include at least one storage medium from among a flash memory-type storage medium, a hard disk-type storage medium, a multimedia card micro-type storage medium, card-type memories (e.g., an SD card, an XD memory, and the like), Random Access Memory (RAM), Static Random Access Memory (SRAM), Read-Only Memory (ROM), Electrically Erasable Programmable Read-Only Memory (EEPROM), Programmable Read-Only Memory (PROM) magnetic memory, a magnetic disc, and an optical disc. In addition, the memory 150 may drive a web storage that performs a storing function of the memory 150 via the Internet. According to various embodiments of the present disclosure, the memory may include a non-transitory computer-readable storage medium.

The programs stored in the memory 150 may be classified into a plurality of modules according to functions thereof. For example, the programs stored in the memory 150 may be classified into a User Interface (UI) module 151, an external device registration module 152, a metadata management module 153, a content reproduction module 154, a control command conversion module 155, and/or an application module 156. However, various embodiments of the present disclosure are not limited thereto.

The UI module 151 may provide a specialized UI or GUI which interoperates with the at least one external device 200 according to applications. The UI module 151 may include a touch screen module. The touch screen module may detect a user's touch gesture on the touch screen and may transmit information related to the touch gesture to the control unit 140. The touch screen module may be configured as a separate controller (hardware).

Various sensors may be arranged in or near the touch screen so as to detect a touch or a proximate touch on the touch sensor. An example of the sensor to detect the touch on the touch screen may be a tactile sensor. The tactile sensor detects a contact of a specific object at least as much as a person can detect. The tactile sensor may detect various types of information such as the roughness of a contact surface, the hardness of the contact object, the temperature of a contact point, and/or the like.

The touch gesture of the user may include a tap gesture, a touch & hold gesture, a double tap gesture, a drag gesture, a panning gesture, a flick gesture, a drag & drop gesture, and/or the like.

"Tapping" is a user's motion of touching a screen by using a finger or a touch tool such as an electronic pen and then instantly lifting the finger or touch tool from the screen without moving.

"Touching & holding" is a user's motion of touching a screen by using a finger or a touch tool such as an electronic pen and then maintaining the above touching motion over a critical time (e.g., 2 seconds), after touching the screen. For example, a time difference between a touch-in time and a touch-out time is greater than or equal to the critical time (e.g., 2 seconds). When a touch input lasts more than the critical time, in order to remind the user whether the touch input is tapping or touching & holding, a feedback signal may be provided in a visual, acoustic, or tactile manner. The critical time may vary according to various embodiments of the present disclosure. The critical time may be configurable according to user preferences and/or device preferences.

"Double tapping" is a user's motion of touching the screen twice by using the finger or touch tool (e.g., such as a stylus pen).

"Dragging" is a user's motion of touching the screen by using the finger or touch tool and moving the finger or touch tool to another position on the screen while keeping the touching motion. The dragging motion may enable the moving or panning motion of an object.

"Panning" is a user's motion of performing a dragging motion without selecting an object. Because no object is selected in the panning motion, no object is moved in a page but the page itself is moved on the screen or a group of objects may be moved within a page.

"Flicking" is a user's motion of performing a dragging motion over a critical speed (e.g., 100 pixel/s), by using the finger or touch tool. The dragging (panning) motion or the flicking motion may be distinguished based on whether the moving speed of the finger or touch tool is over the critical speed (e.g., 100 pixel/s), or not. The critical speed may be configurable according to user preferences and/or device preferences.

"Dragging & Dropping" is a user's motion of dragging an object to a predetermined position on the screen by using the finger or touch tool and then dropping the object at that position.

"Pinching" is a user's motion of moving two fingers touching on the screen in opposite directions. The pinching motion is a gesture to magnify (open pinch) or contract (close pinch) an object or a page. A magnification value or a contraction value is determined according to the distance between the two fingers.

"Swiping" is a user's motion of touching an object on the screen by using the finger or touch tool and simultaneously moving the object horizontally or vertically by a predetermined distance. A swiping motion in a diagonal direction may not be recognized as a swiping event.

The memory 150 may include a voice recognition module (not shown) that recognizes a voice of the user by using a voice recognition engine and transmits the recognized voice to the control unit 140.

The external device registration module 152 may receive device information about the at least one external device 200 via first short-distance communication. According to various embodiments of the present disclosure, the device information about the at least one external device 200 may include, but is not limited thereto, at least one of ID information of the at least one external device 200, connection information for connecting second short-distance communication, a type of the at least one external device 200, a capability of the at least one external device 200, information about a category and a protocol used to control the at least one external device 200, information about an application for controlling the at least one external device 200, and the like.

When an application related to the at least one external device 200 is not installed in the terminal 100, the external device registration module 152 may download and install the application related to the at least one external device 200.

The external device registration module 152 may store and manage the device information about the at least one external device 200 in an external device DataBase (DB). When the device information about the at least one external device 200 is changed, the external device registration module 152 may update the device information stored in the external device DB.

The metadata management module 153 may obtain metadata corresponding to the predetermined portion of the content. For example, the metadata management module 153 may extract the metadata inserted into the content, may receive the metadata corresponding to the predetermined portion of the content from an external source, or may generate the metadata corresponding to the predetermined portion of the content by performing image processing on the content. The metadata management module 153 may generate the metadata corresponding to the predetermined portion of the content by referring to a type of an external device connected to the terminal 100. In addition, when the metadata management module 153 detects connection of another external device during reproduction of the content, the metadata management module 153 may generate the metadata corresponding to the predetermined portion by further referring to the connected other external device.

When reproduction of the content is complete or the content is deleted, the metadata management module 153 may delete the metadata so as to efficiently manage the memory 150.

The content reproduction module 154 may reproduce the content in response to a user request. The content reproduction module 154 may reproduce the predetermined portion of the content by interoperating with the at least one external device 200.

According to various embodiments of the present disclosure, the content may include, but is not limited to, education content, movie content, broadcasting content, game content, and the like.

When the control command is transmitted to the at least one external device 200, the content reproduction module 154 may discontinue reproduction of the content, and when a message corresponding to the control command is received from the at least one external device 200, the content reproduction module 154 may resume reproduction of the discontinued content.

The content reproduction module 154 may identify the control information included in the metadata corresponding to the predetermined portion of the content and may transmit the control information to the control command conversion module 155.

The control command conversion module 155 may select the at least one external device 200 that is to reproduce the predetermined portion of the content and that is from among one or more external devices connected to the terminal 100, based on the control information. Thereafter, the control command conversion module 155 may convert the control information into the control command that matches the control protocol of the at least one external device 200.

According to various embodiments of the present disclosure, the control command conversion module 155 may be included in each of applications for controlling one or more external devices 200, respectively. For example, the respective applications for controlling the respective external devices 200 may have information about respective control protocols of the respective external devices 200, and may generate respective control commands to be read by the respective external devices 200, by using the information about the respective control protocols.

The application module 156 may be connected to an application DB and the external device DB. The application DB may store one or more applications for controlling one or more external devices 200, respectively. For example, the application DB may store an application for controlling a medical apparatus, an application for controlling a sporting equipment, an application for controlling a home gateway, an application for controlling a CE device, or the like. The external device DB may store one or more pieces of device information about the one or more external devices 200.

The application module 156 may control the at least one external device 200 by using an application for controlling the at least one external device 200. For example, the application module 156 may transmit a control command for controlling the at least one external device 200 to the at least one external device 200.

One or more embodiments of the present disclosure may also be embodied as programmed commands to be executed in various computer means, and then may be recorded to a non-transitory computer-readable recording medium. The non-transitory computer-readable recording medium may include one or more of the programmed commands, data files, data structures, or the like. The programmed commands recorded on the non-transitory computer-readable recording medium may be particularly designed or configured for one or more embodiments of the present disclosure or may be well known to one of ordinary skill in the art. Examples of the non-transitory computer-readable recording medium include magnetic media including hard disks, magnetic tapes, and floppy disks, optical media including CD-ROMs and DVDs, magneto-optical media including optical disks, and a hardware apparatus designed to store and execute the programmed commands in ROM, RAM, a flash memory, and the like. Examples of the programmed commands include not only machine codes generated by a compiler but also codes to be executed in a computer by using an interpreter. The hardware apparatus may be configured to function as one or more software modules so as to perform operations of one or more embodiments of the present disclosure, or vice versa.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of reproducing content, the method performed by a terminal and comprising:
   obtaining, by the terminal, metadata corresponding to the content;
   selecting, by the terminal, at least one external device to perform an operation associated with a portion of the content based on the metadata;
   transmitting, by the terminal, a control command to the at least one external device; and
   establishing interoperation between the terminal and the at least one external device to which the control command is transmitted,
   wherein the terminal and the at least one external device are synchronized such that the terminal displays the content and the at least one external device performs the operation associated with the portion of the content.

2. The method of claim 1, further comprising:
   executing, by the terminal, a first application for reproducing the content; and
   executing, by the terminal, a second application for controlling the at least one external device.

3. The method of claim 2, wherein the first application transmits control information comprised in the metadata to the second application, and
   the second application converts the control information into the control command according to a control protocol of the at least one external device.

4. The method of claim 1, wherein the metadata comprises at least one of information about the predetermined portion, IDentification (ID) information of the at least one external device, and capability information about a capability to be performed by the at least one external device.

5. The method of claim 1, wherein the obtaining of the metadata comprises extracting the metadata inserted into the content.

6. The method of claim 1, wherein the obtaining of the metadata comprises receiving, from an external source and separately from the content, the metadata corresponding to the operation associated with the portion of the content.

7. The method of claim 1, wherein the obtaining of the metadata comprises generating the metadata corresponding to the operation associated with the portion of the content by performing image processing on the content.

8. The method of claim 7, wherein the generating of the metadata comprises generating the metadata corresponding to the operation associated with the portion of the content by considering a type of the at least one external device connected to the terminal.

9. The method of claim 8, wherein the generating of the metadata comprises:
   detecting connection of another external device while the content is displayed by the terminal; and
   generating the metadata corresponding to the operation associated with the portion by further considering the connection of the other external device.

10. The method of claim 8, further comprising, when displaying of the content by the terminal is completed, deleting the metadata.

11. The method of claim 1, wherein the selecting of the at least one external device comprises selecting the at least one external device that is to perform the operation associated with the content from among a plurality of external devices connected to the terminal.

12. The method of claim 1, wherein the displaying the content by the terminal comprises:
   when the control command is transmitted to the at least one external device, discontinuing displaying of the content; and
   when a message corresponding to the control command is received by the terminal from the at least one external device, resuming displaying of the discontinued content by the terminal.

13. The method of claim 12, wherein the control command comprises a command for controlling the at least one external device to display a question associated with the content, and
   wherein the message corresponding to the control command comprises a response message with respect to the question associated with the content.

14. The method of claim 12, wherein the control command comprises a command for controlling the at least one external device to perform setting according to a setting value associated with the content, and
   wherein the message corresponding to the control command comprises a completion message with respect to the setting.

15. A terminal comprising:
   a memory configured to store at least one program; and
   a control unit configured to reproduce content by executing the at least one program,
   wherein the at least one program comprises commands for:
   obtaining, by the terminal, metadata corresponding to the content;
   selecting, by the terminal, at least one external device to perform an operation associated with a portion of the content based on the metadata;
   transmitting, by the terminal, a control command to the at least one external device;
   establishing interoperation between the terminal and the at least one external device to which the control command is transmitted such that the terminal and the at least one external device to which the control command is transmitted are synchronized; and
   displaying, by the terminal, the content while the at least one external device which the control command is transmitted performs the operation associated with the portion of the content.

16. The terminal of claim 15, wherein the control unit executes a first application for reproducing the content and a second application for controlling the at least one external device.

17. The terminal of claim 15, wherein the control unit generates the metadata corresponding to the content by performing image processing on the content.

18. The terminal of claim 17, wherein the control unit generates the metadata corresponding to the content by considering a type of the at least one external device connected to the terminal.

19. The terminal of claim 18, wherein the control unit detects connection of another external device while the content is displayed, and generates the metadata corresponding to the content by further considering the connection of the other external device.

20. The terminal of claim 18, wherein, when displaying of the content is completed, the control unit deletes the metadata.

* * * * *